(12) United States Patent
Ioka et al.

(10) Patent No.: US 7,129,456 B2
(45) Date of Patent: Oct. 31, 2006

(54) METHOD AND APPARATUS FOR CALCULATING IMAGE CORRECTION DATA AND PROJECTION SYSTEM

(75) Inventors: Ken Ioka, Hachioji (JP); Toru Wada, Niiza (JP); Kensuke Ishii, Tokyo (JP)

(73) Assignee: Olympus Corporation, Tokyo (JP)

( * ) Notice: Subject to any disclaimer, the term of this patent is extended or adjusted under 35 U.S.C. 154(b) by 85 days.

(21) Appl. No.: 10/504,888

(22) PCT Filed: Feb. 17, 2003

(86) PCT No.: PCT/JP03/01639

§ 371 (c)(1),
(2), (4) Date: Aug. 18, 2004

(87) PCT Pub. No.: WO03/071794

PCT Pub. Date: Aug. 28, 2003

(65) Prior Publication Data

US 2005/0103976 A1     May 19, 2005

(30) Foreign Application Priority Data

Feb. 19, 2002  (JP) ............................. 2002-042206

(51) Int. Cl.
*H01L 27/00*  (2006.01)
*G01J 3/50*  (2006.01)
(52) U.S. Cl. .................... 250/208.1; 250/226
(58) Field of Classification Search ............. 250/208.1, 250/226
See application file for complete search history.

(56) References Cited

U.S. PATENT DOCUMENTS

| 5,396,257 A | * | 3/1995 | Someya et al. ............... 345/1.1 |
| 5,838,396 A | | 11/1998 | Shiota et al. |
| 6,704,008 B1 | * | 3/2004 | Naito et al. .................. 345/207 |
| 2001/0015835 A1 | | 8/2001 | Aoki |

FOREIGN PATENT DOCUMENTS

| CA | 2165142 A1 | 6/1996 |
| JP | 5-173523 A | 7/1993 |
| JP | 7-226862 A | 8/1995 |
| JP | 8-223519 A | 8/1996 |
| JP | 2001-209358 A | 8/2001 |
| JP | 2001-343954 A | 12/2001 |

* cited by examiner

*Primary Examiner*—Georgia Epps
*Assistant Examiner*—Pascal M. Bui-Pho
(74) *Attorney, Agent, or Firm*—Frishauf, Holtz, Goodman & Chick, P.C.

(57) ABSTRACT

An image correction data calculation method comprises the steps of acquiring an input-output characteristic at each of a plurality of display elements on a display screen of an image display device, on the basis of image data captured by a CCD camera (steps S101 to S105), setting a target input-output characteristic to be obtained at each of the plurality of display elements (step S106), and calculating image correction data used to correct the input-output characteristic for an input image signal, according to the locations of display elements on the screen, on the basis of the input-output characteristic acquired in the acquisition step and the target input-output characteristic to be obtained (step S107).

5 Claims, 18 Drawing Sheets

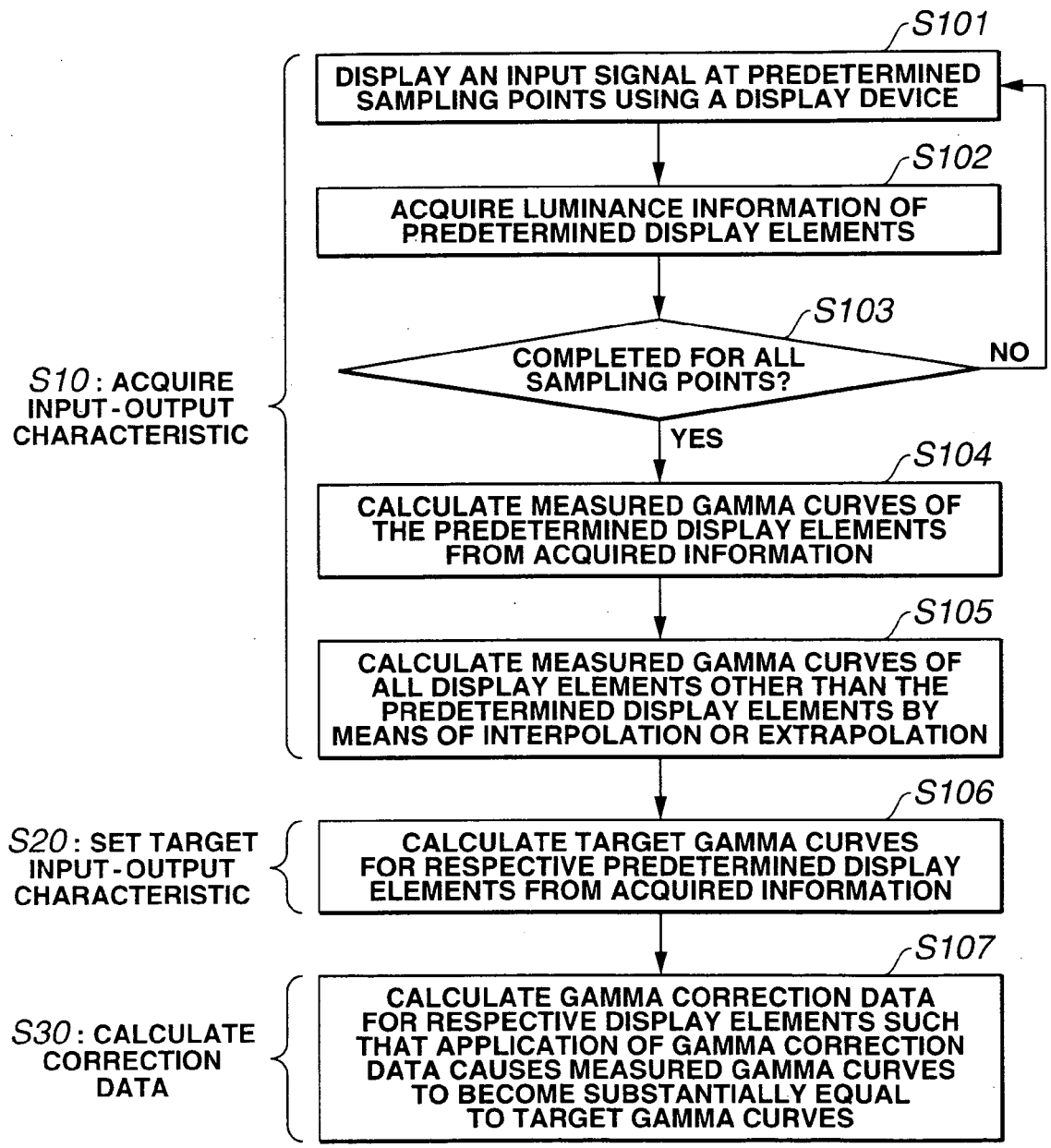

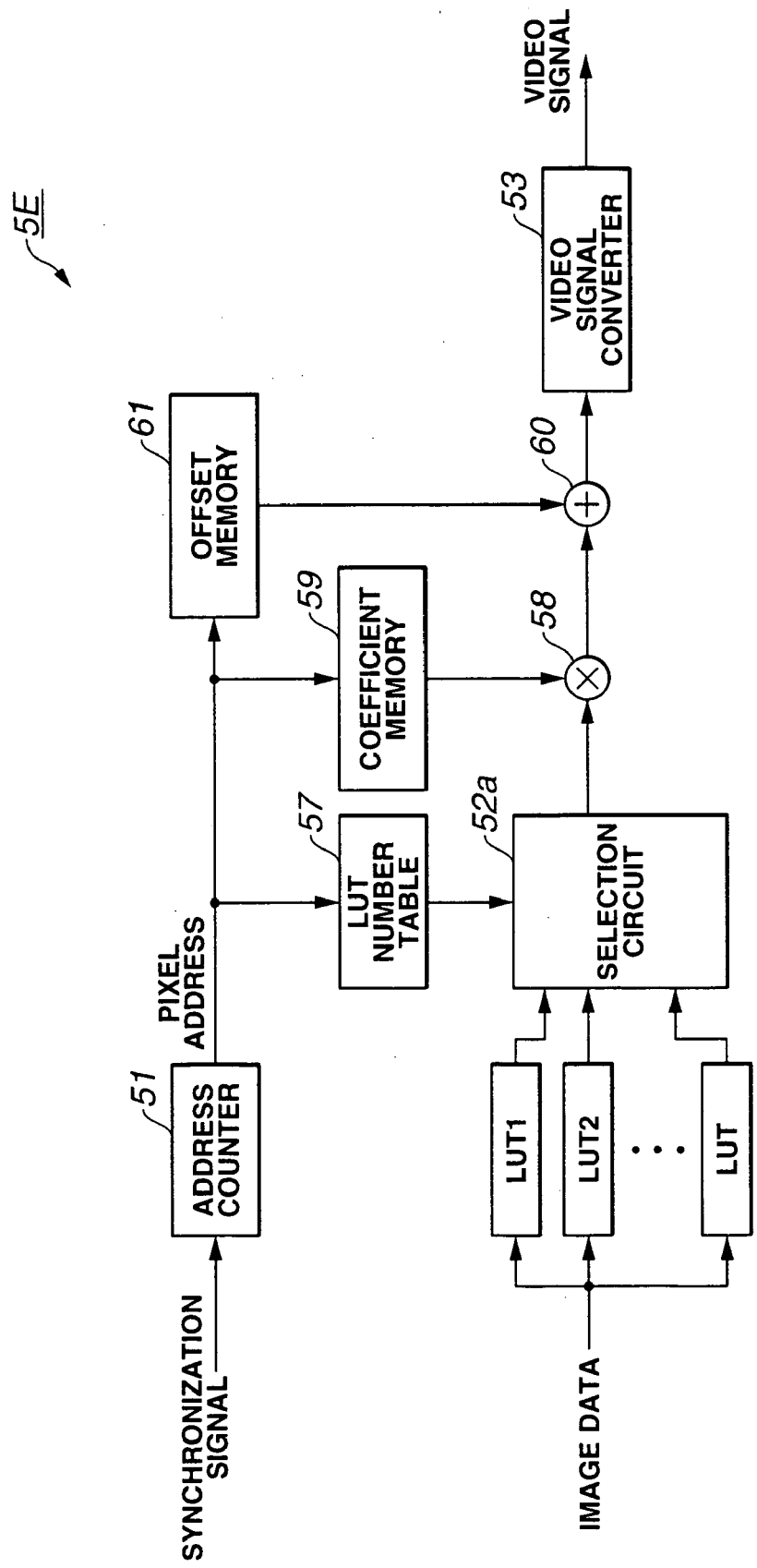

METHOD AND APPARATUS FOR CALCULATING IMAGE CORRECTION DATA AND PROJECTION SYSTEM

This application is a U.S. National Phase Application under 35 USC 371 of International Application PCT/JP03/01639 filed Feb. 17, 2003.

TECHNICAL FIELD

The present invention relates to a method and apparatus for calculating image correction data for correcting nonuniformity of luminance and/or color in a projection system using a single image display device or in a multiprojection system in which a single screen is formed using a plurality of image display devices. The present invention also relates to a projection system.

BACKGROUND ART

In general, a multiprojection system includes a screen on which to project an image, a plurality of projectors for projecting images to respective assigned areas on the screen, and a projector array controller for supplying, to each projector, a video signal associated with an image to be projected by each projector.

A seamless projection system is known as one type of multiprojection system. In the seamless projection system, a plurality of images are projected by a plurality of projectors onto a screen such that the images are partially overlapped on the screen, thereby forming a single seamless image. To obtain a single image on a screen in such a seamless projection system, it is necessary to precisely align individual images projected on the screen such that edge lines of adjacent individual images precisely coincide with each other.

In the multiprojection system, respective projectors are different in luminance and color, and thus correction in terms of luminance and color is necessary.

A known method or apparatus for calculating image correction data used to correct luminance difference or color difference may be found, for example, in Japanese Unexamined Patent Application Publication No. 7-226862 (first conventional technique) or Japanese Unexamined Patent Application Publication No. 5-173523 (second conventional technique).

In the first conventional technique, an output signal of an image signal associated with an image to be projected is compared with a reference signal prepared in advance. Image correction data is produced on the basis of a difference detected in the comparison. The image signal is corrected by applying the produced image correction data to the image signal, and the resultant output signal is compared with the reference signal. The above process is performed repeatedly until optimum image correction data, which allows the output signal to be substantially equal to the reference signal, is obtained.

In the second conventional technique, an image signal with a uniform and constant level is input to respective projectors of a multiprojection system, and, first, an adjustment is made such that the output signal level of each projector becomes uniform. Then, a further adjustment is made such that the output signal levels of the respective projectors become equal to each other. Final adjusted values used in the above adjustment are employed as image correction data.

Any projector has more or less nonuniformity of luminance because the input-output characteristic representing the relationship between the level of an input image signal and the corresponding level of output luminance signal varies depending on the display position (hereinafter, the input-output characteristic will be referred to as a gamma characteristic). In the case of a color projector, more or less nonuniformity of color occurs owing to differences in gamma characteristic among primary colors.

In particular, in a multiprojection system, because one screen is formed using a plurality of projectors, differences in gamma characteristic among projectors can cause rather large nonuniformity in luminance and/or color. In a case of a seamless multiprojection system, the gamma characteristic in overlapping areas is influenced by a plurality of projectors.

In the method of producing shading correction data according to the first conventional technique, correction data is produced such that nonuniformity in luminance and color is eliminated at a signal level of an image to be displayed. Therefore, although nonuniformity in luminance and color is corrected for an input image with a particular signal level, nonuniformity in luminance or color is not necessarily eliminated for input images with other different signal levels.

In the second conventional technique, image correction data used to correct luminance nonuniformity in a multiprojection system is produced as follows. First, an adjustment is made for each projector such that luminance nonuniformity is eliminated, and then a further adjustment is made such that luminance differences among projectors are minimized. The adjustment data finally used in the adjustment is employed as the image correction data. In this method, a large number of steps are needed to produce the image correction data. Besides, it is not possible practically to acquire image correction data for each display position. When projectors have overlap areas on a screen as in seamless multiprojection systems, each overlap area is influenced by corresponding two projectors. This makes it very difficult to obtain accurate image-correct data because it is necessary to simultaneously make an adjustment of luminance uniformity and color uniformity within each projector and also among the projectors.

In view of the above, it is an object of the present invention to provide a method and apparatus for calculating image correction data, which allow automatic and easy production of image correction data for each display position of a projector, for use in reducing at least one of luminance nonuniformity and color nonuniformity.

It is another object of the present invention to provide a projection system capable of projecting a seamless image whose luminance nonuniformity and/or color nonuniformity are reduced using produced image correction data, for all input image signal levels.

DISCLOSURE OF INVENTION

The present invention provides a method of calculating image correction data, comprising a step of acquiring an input-output characteristic at each of a plurality of display elements on a display screen of an image display device including one or more image display units, on the basis of image data captured by image capture means, a step of setting a target input-output characteristic to be obtained at each of the plurality of display elements, and a step of calculating image correction data used to correct the input-output characteristic for an input image signal, depending on the locations of display elements on the screen, on the basis of the input-output characteristic acquired in the acquisition step and the target input-output characteristic to be obtained.

The present invention also provides an image correction data calculator for calculating image correction data on the basis of a measured input-output characteristic of an image display device, wherein the image correction data calculator comprising: characteristic measurement means for acquiring an input-output characteristic at each of a plurality of display elements on a display screen of an image display device, on the basis of image data captured by image capture means; image correction means for setting a target input-output characteristic to be obtained at each of the plurality of display elements; and calculation means for calculating image correction data on the basis of the input-output characteristic measured by the characteristic measurement means and the target input-output characteristic to be obtained.

The present invention also provides a projection system having a capability of correcting an image using image correction data, wherein the projection system comprising: image output means for outputting image data to be displayed; image correction means for correcting the image data output from the image output means in accordance with the image correction data; and image display means for displaying the image data corrected by the image correction means.

BRIEF DESCRIPTION OF THE DRAWINGS

FIG. 2 is a flow chart showing an image correction data calculation method implemented by the image correction data calculator according to the first embodiment of the present invention;

FIG. 22 is a block diagram showing a second modification of the image correction unit used in a projection system, according to the seventh embodiment of the present invention.

BEST MODE FOR CARRYING OUT THE INVENTION

Embodiments of the present invention are described below with reference to the accompanying drawings.

(First Embodiment)

Figure 1A:
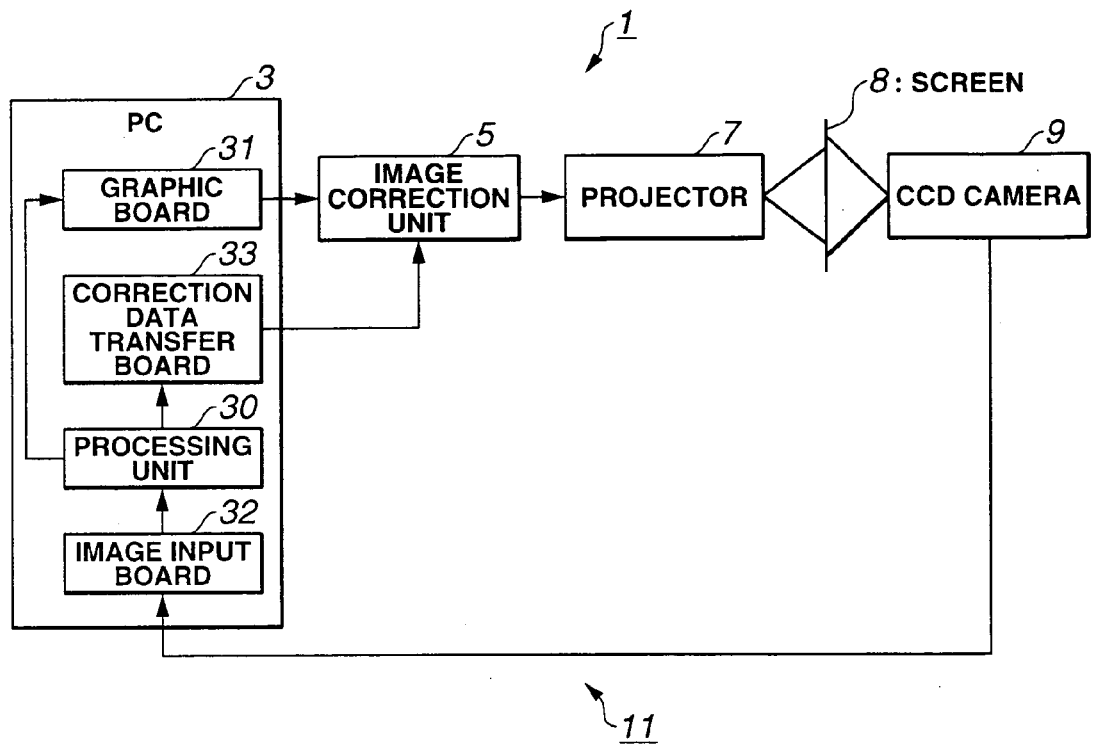
FIG. 1A and FIG. 1B are a block diagram showing a projection system including an image correction data calculator and a processing unit, according to a first embodiment of the present invention.

FIGS. 1A to 7 are diagrams explaining a first embodiment of the present invention. FIG. 1A and FIG. 1B are a block diagram showing a projection system including an image correction data calculator and a processing unit, according to a first embodiment of the present invention.

As shown in FIG. 1A, in this first embodiment of the present invention, an image correction data calculator 1 mainly includes: a personal computer (PC) 3 serving as processing means for executing an operating system and an image correction data calculation program to implement an image correction data calculation method according to the first embodiment of the invention and also serving as characteristic measurement means; an image correction unit 5 serving as image correction means for correcting an image signal output from the PC 3 in accordance with image correction data; a liquid crystal projector (referred to simply as a "projector" in the drawings and hereinafter in the present description) 7 serving as an image display device and image display means for projecting an image in accordance with image data output from the image correction unit 5 and also serving as characteristic measurement means; a screen 8 serving as an image display device and image display means for displaying the image projected by the liquid crystal projector 7; and a CCD (Charge Coupled Device) camera 9 serving as image capture means for capturing an image displayed on the screen 8 and also serving as characteristic measurement means.

The PC 3 includes, at least, an image input board 32 for inputting, to the PC 3, a digital image signal output from the CCD camera 9, a processing unit 30 serving as analysis means for calculating image correction data on the basis of the image signal input via the image input board 32 by executing the image correction data calculation program and also serving to execute the operating system and other processing, a correction data transfer board 33 for transferring gamma correction data, which is image correction data calculated by the processing unit 30, to the image correction unit 5, and a graphic board 31 serving as image output means for outputting, under the control of the processing unit 30, an analog signal including R (Red), G (Green) and B (Blue) components in a VGA (Video Graphics Array) format to the image correction unit 5.

Figure 1B:
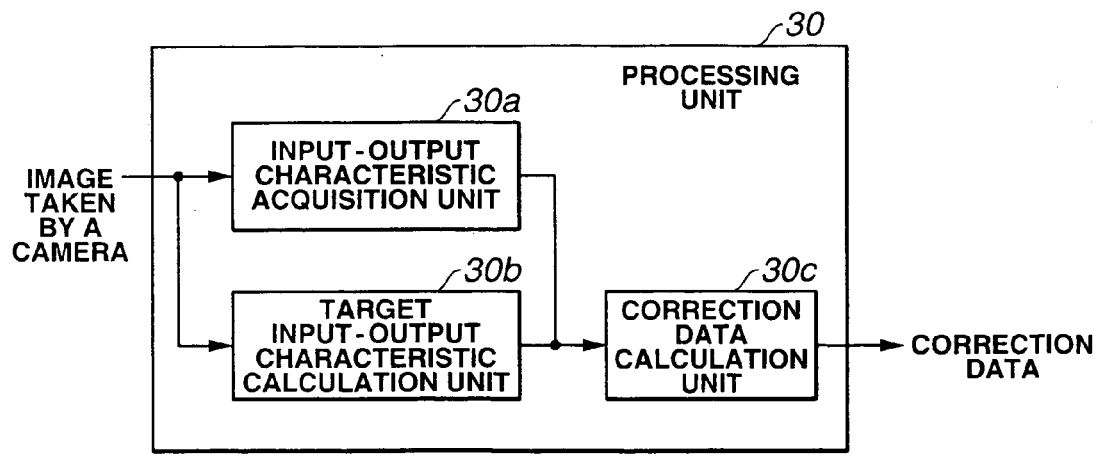

More specifically, as shown in FIG. 1B, the processing unit 30 includes an input-output characteristic acquisition unit 30a for acquiring an input-output characteristic on the basis of the captured image input via the image input board 32, a target input-output characteristic calculation unit 30b for determining a target input-output characteristic by means of calculation based on the captured image input via the image input board 32, and a correction data calculation unit 30c for calculating correction data based on the input-output characteristic acquired via the input-output characteristic acquisition unit 30a and the target input-output characteristic calculated by the target input-output characteristic calculation unit 30b.

The projection system 11 is formed by the PC 3, the image correction unit 5, the liquid crystal projector 7, and the screen 8.

The operation of image correction data calculator constructed in the above-described manner according to the first embodiment is described below based on FIG. 1A and FIG. 1B and with reference to FIGS. 2 to 7. FIG. 2 is a flow chart showing an image correction data calculation method implemented by the image correction data calculator according to the first embodiment of the present invention.

The image correction data calculator 1 produces gamma correction data, that is, image correction data, by performing a process including three main steps (S10, S20, and S30) shown in FIG. 2.

In step S10 (acquisition of measured gamma characteristic), the gamma characteristic corresponding to a display position of the image display device formed by the liquid crystal projector 7 and the screen 8 is acquired (the display position corresponds to a display element (that is a display element (generally called a display pixel) as the basic unit in displaying an image, and thus the display position will also be referred to as a display element. Accordingly, the notation such as "display element" or "display pixel" is used also in the drawings).

In step S20 (calculation of target gamma characteristic), a target gamma characteristic corresponding to the measured display element is set.

In step S30, gamma correction data is calculated by the PC 3 serving as the processing means.

The acquisition of the measured gamma characteristic in step S10 is described in further detail below.

The gamma characteristic is synonymous with the input-output characteristic of the system. Thus, the gamma characteristic can be acquired by measuring an input signal and an output signal corresponding to the input signal.

In the present embodiment, the input signal is defined as a signal applied to the graphic board 31 from the processing unit 30 of the PC 3. A signal output from the graphic board 31 is projected onto the screen 8 by the liquid crystal projector 7, and an image displayed on the screen 8 is captured by the CCD camera 9. An image signal output from the CCD camera 9 is defined as the output signal described above.

Herein, by way of example, it is assumed that the input signal takes an 8-bit value (from "0" to "255") indicating a gray level, and the output signal also takes an 8-bit value (from "0" to "255") (this assumption is used in many actual projection systems).

In order to acquire gamma characteristic data in a perfect form, it is needed, theoretically, to acquire the output signal level corresponding to each of all allowable input signal levels. In practice, an approximated gamma characteristic data can be acquired by acquiring input-output data for levels taken at particular intervals bit values in the dynamic range from "0" to "255" and calculating input-output data at the other levels by means of interpolation. The input signal levels selected for use in acquisition of the approximated gamma characteristic data are referred to as sampling points.

In this first embodiment, input signal levels of "0", "16", "32", "48", "64", "80", "96", "112", "128", "144", "160", "176", "192", "208", "224", "240", and "255" are selected as measurement sampling points, and a test image having a signal level corresponding to one of the measurement sampling points for predetermined display elements is stored in the PC 3 in advance for all the sampling points. More specifically, for example, for a sampling point "0", the test image has a signal level of "0" at predetermined ones of 2-dimensionally arranged display elements of the image display device. For a sampling point "16", the test image has a signal level of "16" at the predetermined display elements. Test image data may include a signal with a level corresponding to each sampling point to all display elements to allow acquisition of gamma characteristic data for all display elements, although a longer processing time is needed.

To acquire the measured gamma characteristic, first, initial gamma correction data which has no actual correction effect in this initial state is transferred from the PC 3 to the image correction unit 5 via the correction data transfer board 33.

Thereafter, the processing unit 30 of the PC 3 executes the image correction data calculation program according to the first embodiment of the invention thereby outputting a test image with a signal level corresponding to a sampling point "0" to the image correction unit 5 via the graphic board 31.

Because the gamma correction data has no correction capability at this stage, the image correction unit 5 performs gamma correction on the received test image data using standard gamma correction data and outputs the resultant data to the liquid crystal projector 7. The liquid crystal projector 7 projects an image in accordance with the received data thereby displaying the test image on the screen 8 (step S101).

Thereafter, the processing unit 30 of the PC 3 controls the CCD camera 9 to capture a whole image displayed on the screen 8. The image data captured by the CCD camera 9 is stored in a storage device of the PC 3 via the image input board 32 (step S102).

In the above process of taking the image using the CCD camera 9, the image can be more accurately captured and measurement accuracy can be improved by blocking external light in an environment where the image is taken, automatically adjusting exposure of the CCD camera 9, and/or cumulatively adding the signal output from the CCD camera 9 in capturing the image.

In the next step (S103), the processing unit 30 of the PC 3 determines whether the processing on the test image is completed for all sampling points. If the processing is not completed, steps S101 to S103 are repeated, changing the sampling point, until the processing on the test image is completed for all sampling points.

When it is determined in step S103 that the processing unit 30 of the PC 3 has captured the image for all sampling points, the process of determining the gamma characteristic of the predetermined display elements from the captured image is started.

The processing unit 30 of the PC 3 acquires an output signal at a sampling point, on the basis of the correspondence between the location of the predetermined display elements and the pixel location of the CCD camera 9. An output signal for an input signal with a level other than the sampling points can be calculated by means of interpolation from output signals obtained for input signals with levels close to sampling points. In the interpolation for the above purpose, linear interpolation or spline interpolation may be employed. The processing unit 30 of the PC 3 performs the above-described process for all of the predetermined display elements, and calculates the measured gamma characteristic curve for each of all the predetermined display elements from the acquired information (step S104).

The processing unit 30 of the PC 3 calculates the gamma characteristic of each of display elements other than the predetermined display elements by means of interpolation or extrapolation from the gamma characteristics of the predetermined display elements (step S105). When it is desirable to perform the calculation in a short time or when the available storage capacity is limited, the display screen may be divided into blocks each including, for example, 4×4 display elements, and the gamma characteristic may be determined for each block on the assumption that all display elements in the same block are substantially equal in gamma characteristic. The block size may be adaptively varied depending on the luminance nonuniformity. That is, the block size is set to be small in an area having large luminance nonuniformity, and the block size is set to be large in an area having small luminance nonuniformity. The data size of the gamma characteristic data may be reduced by analyzing the gamma characteristic data obtained for each of all display elements, grouping together similar gamma characteristics, and expressing the gamma characteristic of each group by a single representative gamma characteristic.

Thus, the gamma characteristic at each display position on the display screen is obtained by performing the above-described process.

Now, the process of setting (calculating) a target gamma characteristic to be obtained in main step S20 on the basis of the acquired information (in step S106) is described.

In this image correction data calculator 1 according to the first embodiment of the present invention, the CCD camera 9 takes the place of a human eye. That is, when there is no irregularity in the distribution of luminance over the image captured by the CCD camera 9, the image display device is regarded as having no irregularity in the distribution of luminance. When the luminance changes smoothly, the image display device can also be regarded as having no irregularity in the distribution of luminance. A target image corresponding to the captured image at the sampling point is set, and the target gamma characteristic can be calculated by applying to the target image the same calculation method used to obtain the gamma characteristic at each display element of the display screen.

The method of setting a target image for a given sampling point is described in detail below.

Figure 3:
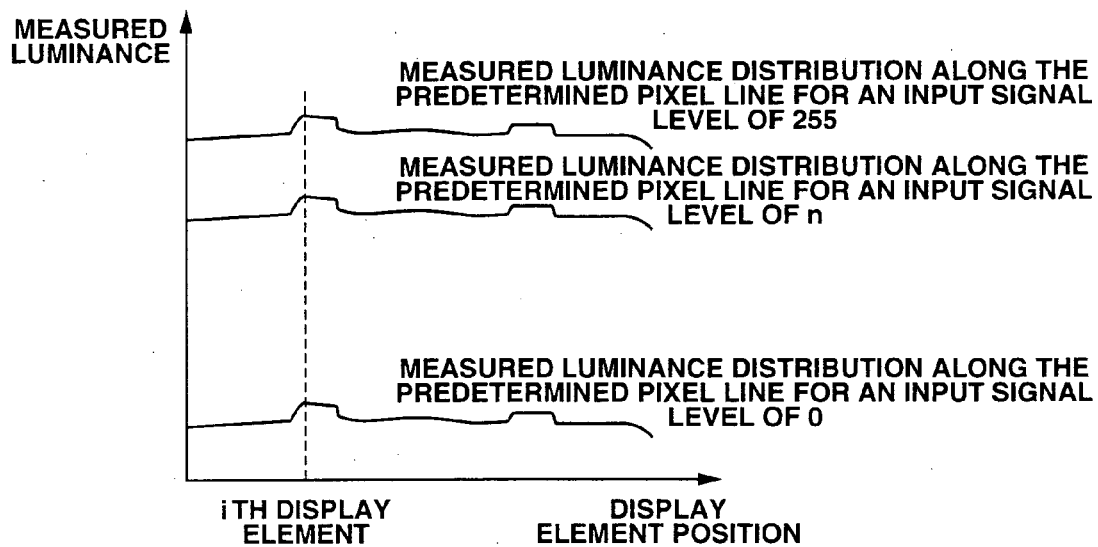
FIG. 3 is a characteristic diagram showing measured luminance distributions along display positions, in the image correction data calculator according to the first embodiment of the invention.

Referring to FIG. 3, an example of a measured luminance distribution will be described. FIG. 3 is a characteristic diagram obtained, in the image correction data calculator according to the first embodiment of the invention, by plotting the luminance distribution along a predetermined display element line (generally called a pixel line) in a 2-dimensional image of the screen 8 for each input signal level. In FIG. 3, the horizontal axis represents the element position, and the vertical axis represents the luminance.

Note that FIG. 3 shows luminance distribution line of sampling points for respective input signal levels of "0", "n", and "255". As can be seen, the luminance varies depending on the element position even for an equal input signal level.

Figure 4:
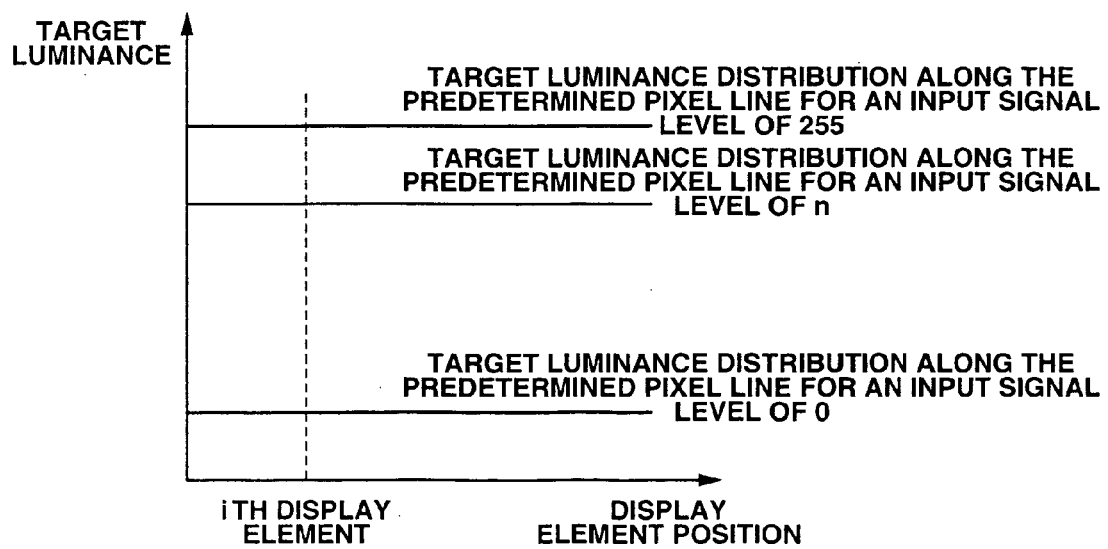
FIG. 4 is a characteristic diagram showing target luminance distributions to be obtained along display positions, in the image correction data calculator according to the first embodiment of the invention.

With reference to FIG. 4, a first method of setting the target image is described below. FIG. 4 is a characteristic diagram plotting a target luminance distribution to be obtained along the display element line in the image correction data calculator according to the first embodiment of the invention. In FIG. 4, the horizontal axis represents the element position, and the vertical axis represents the luminance.

In this first method of setting the target image, the target image is set such that, as shown in FIG. 4, the target image has a uniform luminance distribution, that is, equal luminance is obtained at any display element, for a maximum input signal level ("255"), and for a minimum input signal level ("0"), the target image also has a uniform luminance distribution, that is, the luminance becomes equal at any display element, and furthermore, for an input signal level between the minimum and maximum signal levels, the luminance at any display element becomes equal to the average of luminance values of all pixels of the display screen image captured by the camera.

Figure 5:
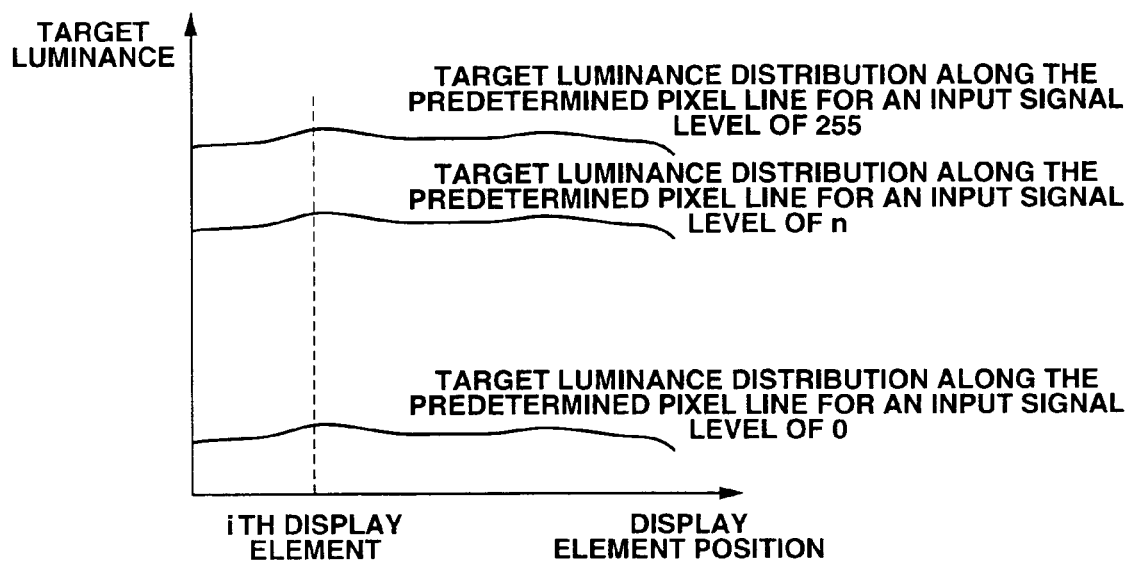
FIG. 5 is a characteristic diagram, which are smoothly varying along a line of the display positions, showing target luminance distributions to be obtained in the image correction data calculator according to the first embodiment of the invention, wherein the luminance distributions are obtained by passing a captured image signal through a lowpass filter.

With reference to FIG. 5, a second method of setting the target image is described below. FIG. 5 is a characteristic diagram showing smoothly varying luminance distributions to be obtained in the target image in the image correction data calculator according to the first embodiment of the invention, wherein the luminance distributions are obtained by passing the captured image signal through a lowpass filter. In FIG. 5, the horizontal axis represents the element position, and the vertical axis represents the luminance.

In this second method of setting the target image, as shown in FIG. 5, a smoothly varying luminance distribution is obtained by passing the captured image signal through the lowpass filter for each of maximum, minimum, and intermediate input signal levels. More specifically, the target image for the input signal with the maximum level ("255") is obtained by passing through the lowpass filter the image signal captured for the input signal with the level of "255". The target image for the input signal with the minimum level ("0") is obtained by passing through the lowpass filter the image signal captured for the input signal with the level of "0". On the other hand, for an input signal with an intermediate level between the maximum and minimum levels, the gamma characteristic curve is set for the output luminance at each pixel such that equation (1) described below is satisfied.

$$(\text{output luminance}) = (\text{input signal value})^\gamma \quad (1)$$

wherein γ is a constant.

This allows the calculation of the target gamma characteristic to be simplified, and thus the calculation can be performed in a short time. Instead of using equation (1) in the calculation, a table representing an input-output characteristic may be used.

The second method of setting the target image allows for the target gamma characteristic to obtain higher contrast than the contrast obtained by the first method of setting the target image.

Figure 6:
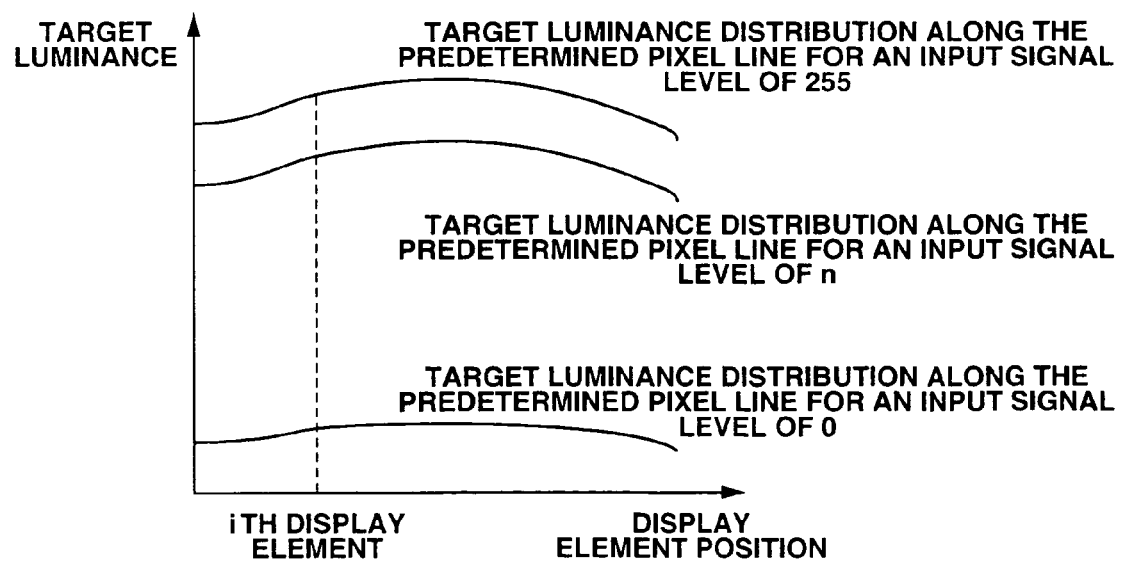
FIG. 6 is a characteristic diagram showing predetermined target luminance distributions along a line of display positions, in the image correction data calculator according to the first embodiment of the invention.

With reference to FIG. 6, a third method of setting the target image is described below. FIG. 6 is a characteristic diagram showing luminance distributions along the scanning line of the target image obtained by the image correction data calculator according to the first embodiment of the invention. In FIG. 6, the horizontal axis represents the element position, and the vertical axis represents the measured luminance.

In this third method of setting the target image, the target image for the input signal with the maximum level ("255") is set so as to have a predetermined luminance distribution. Similarly, the target image for the input signal with the minimum level ("0") is set so as to have a separately predetermined luminance distribution. For input signals with levels between the minimum and maximum levels, the luminance distribution of the target image is calculated in accordance with an equation or a table.

In this third method of setting the target image, the target image can be set so as to have a predetermined luminance distribution, that is, it is possible to achieve a desired distribution. For example, the target image can be set so as to have high contrast only in a central area of the screen.

After the target image is set for all sampling points in the above-described manner, corresponding target gamma characteristics are calculated in a similar manner as in the process of calculating the gamma characteristic.

A method of calculating the gamma correction data in main step S30 on the basis of the measured gamma characteristic and the target gamma characteristic (in step S107) is described below with reference to FIG. 7.

Figure 7:
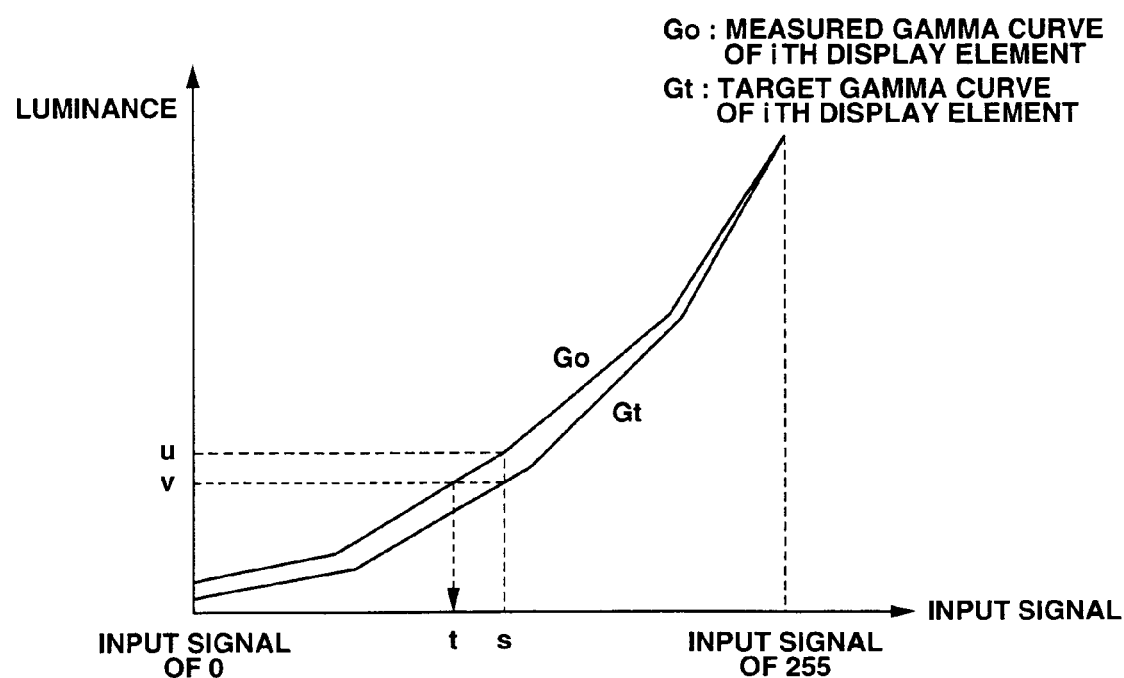
FIG. 7 is a characteristic diagram showing a method of calculating gamma correction data on the basis of a measured gamma characteristic and a target gamma characteristic, in the image correction data calculator according to the first embodiment of the invention.

FIG. 7 is a characteristic diagram showing a method of calculating gamma correction data on the basis of a measured gamma characteristic and a target gamma characteristic, in the image correction data calculator according to the first embodiment of the invention. In FIG. 7, the horizontal axis represents the input signal, and the vertical axis represents the signal output from the CCD camera 9.

In FIG. 7, a measured gamma characteristic (measured gamma curve) Go of an arbitrary display element i on the display screen and a corresponding target gamma characteristic (target gamma curve) Gt are plotted.

Gamma correction data is obtained by producing a lookup table for an input signal such that application of the gamma correction data causes the measured gamma curve Go to be converted to be equal to the target gamma curve Gt.

That is, as can be seen from FIG. 7, the measured gamma curve Go indicates that when an input signal s is applied to the display element i, an output signal u is obtained. On the other hand, the target gamma curve Gt indicates that the target output value corresponding to the input signal s is v.

To obtain the target output of v in the measured gamma curve Go, the input signal must be t. In other words, when the input signal is s, and this input signal is converted into t, then the measured gamma characteristic becomes equivalent to the target gamma characteristic. The conversion from the signal s to the signal t can be achieved by gamma correction. By determining the converted value t corresponding to the input signal s over the entire dynamic range (from "0" to "255" in this specific example), gamma correction data for the display element i can be obtained. This determination process is performed by the processing unit 30 of the PC 3.

In the calculation, the converted value t corresponding to the input signal s can be negative or can be greater than "255". However, in the present example, the gamma correction data is produced by the PC 3 on the assumption that input and output signals are both within the range that can be represented by 8 bits (that is, from "0" to "255"), and thus values out of the above range are clipped between "0" to "255" such that any value falls within the range.

Thus, the gamma correction data for each display position of the screen is obtained. By calculating the gamma correction data for each display element of the image display device in the above-described manner, it becomes possible to make a correction such that a uniform luminance distribution is obtained over the screen.

If the display screen is divided into a plurality of blocks each including a plurality of display elements, and the image correction data is determined for each block, thus the image correction data can be calculated in a short time.

A process of correcting image data in accordance with image correction data determined by the image correction data calculator using the image correction data calculation method according to the first embodiment is described below with reference to FIG. 1A and FIG. 1B.

The projection system 11 includes, in the inside of the image correction unit 5, a plurality of lookup tables (LUTs) that are storage areas (not shown) for storing gamma correction data. Each LUT corresponds to a display position on the screen for which gamma correction data is determined, that is each LUT corresponds to one display element of the image display device. In the case in which the display screen is divided into a plurality of blocks each including a plurality of display elements, each LUT corresponds to one block.

First, gamma correction data produced by the processing unit 30 of the PC 3 are transferred to LUTs of the image correction unit 5 via the correction data transfer board 33. A PC image signal is then transferred as an input signal to the image correction unit 5 from the graphic board 31 of the PC 3. The image correction unit 5 performs the gamma correction on the PC image signal given as the input signal, in accordance with the gamma correction data stored in the LUTs. As described above, by the gamma correction, the PC image signal supplied from the graphic board 31 is converted into a signal that will cause the luminance nonuniformity of the output signal of the projector 7 to be cancelled out and will be outputted from the CCD camera 9. The resultant image signal obtained via the gamma correction is output from the image correction unit 5 to the liquid crystal projector 7. Thus, the liquid crystal projector 7 projects an image with good luminance uniformity onto the screen 8.

(Another Example of the First Embodiment)

Figure 8:
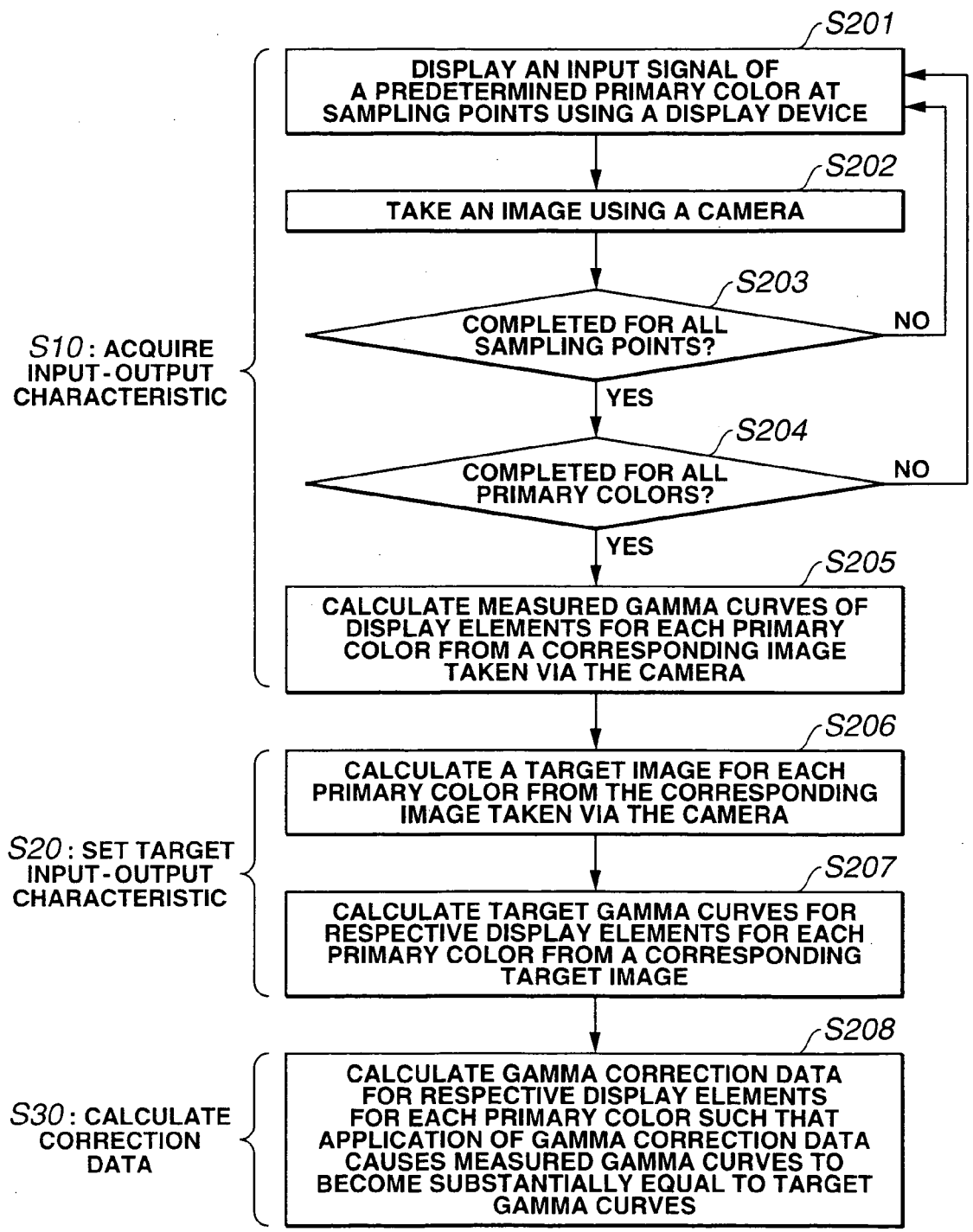
FIG. 8 is a flow chart showing an example of a process performed by the image correction data calculator to calculate gamma correction data used to correct an image including a plurality of color components, according to the first embodiment of the invention.

FIG. 8 is a flow chart showing another example of a process performed by the image correction data calculator to calculate gamma correction data used to correct an image including a plurality of primary color components, according to the first embodiment of the invention.

In the previous example of the first embodiment described above, the projection system 11 projects an image having a single primary color. In contrast, in this example of the first embodiment described below, image display means (for example, a liquid crystal projector having liquid crystal panels responsible for three primary colors (RGB)) is capable of displaying a color image including a plurality of primary color components. The method of producing gamma correction data described in the previous example of the first embodiment can also be applied to production of gamma correction data for each color component R, G, or B in the present example of the first embodiment.

Referring to FIG. 8, a process of calculating image correction data used to correct an image having a plurality of primary color components is described below. Note that similar reference numerals used in the previous example according to the first embodiment described above with reference to FIG. 1A and FIG. 1B are used in the following description.

Under the control of the PC 3, the liquid crystal projector 7 projects a test image of each of three primary colors RGB onto the screen 8, and the test image displayed on the screen 8 is captured by the CCD camera 9 and resultant image data is input to the PC 3 in a similar manner as in the previous example of the first embodiment. For a given color, the above process is performed for each sampling point. After completion of the process for all sampling points, the process is performed for a next color in a similar manner. Thus, a measured gamma characteristic is acquired for each of all primary colors (steps S201 to S205 in main step S10).

Thereafter, as in the previous example of the first embodiment, the PC 3 sets target gamma characteristics in main step S20 to the image correction unit 5 (steps S206 and S207).

More specifically, in the setting of the target gamma characteristics of R, G, and B signals, first, target images are set for a G input signal. That is, a target image for a maximum input signal level ("255"), and a target image for a minimum input signal level ("0"), are set. Furthermore, a target gamma characteristic for intermediate input signal values between the minimum and maximum levels is set using an equation for each display position.

Subsequently, for the R signal and then for the B signal, the target images set for the maximum input signal level ("255") and for the minimum input signal level ("0"), respectively, used in the setting for the G signal are set.

Thereafter, the processing unit 30 of the PC 3 finally calculates the gamma correction data in main step S30 on the basis of the target gamma characteristic and the measured gamma characteristics (step S208).

In this example of the first embodiment, as described above, image correction data, by which to achieve good RGB color balance at all display positions and achieve a uniform color distribution over all display positions, can be calculated.

(Second Embodiment)

Figure 9:
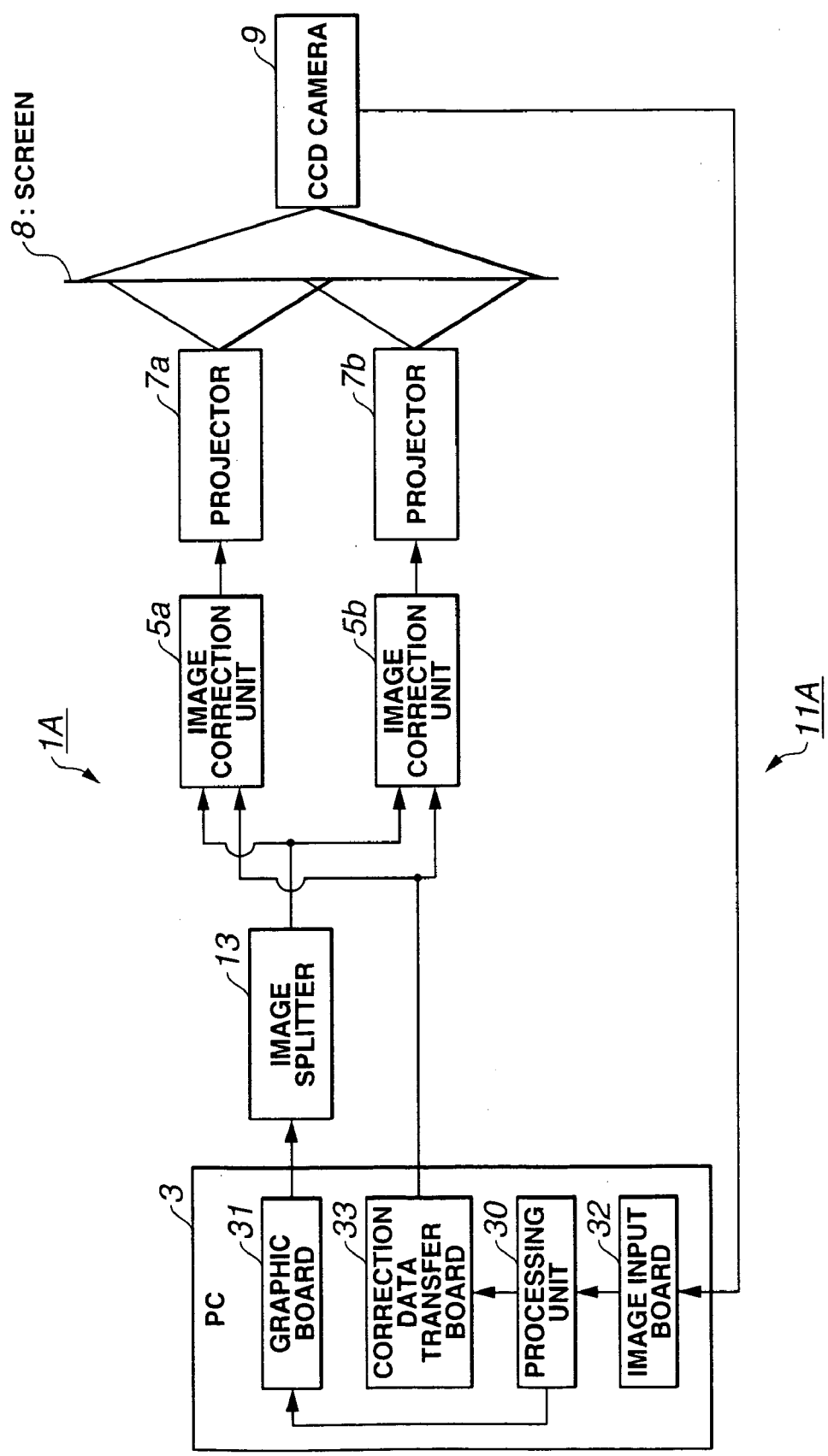
FIG. 9 is a block diagram of an image correction data calculator according to a second embodiment of the present invention.

FIG. 9 is a block diagram showing a projection system including of an image correction data calculator and a processing unit, according to a second embodiment of the present invention.

As shown in FIG. 9, in this second embodiment of the present invention, an image correction data calculator 1A mainly includes: a PC 3 serving as processing means for executing an operating system and an image correction data calculation program to implement an image correction data calculation method, an image splitter 13 for splitting the image signal output from the PC 3 into image signals of respective image areas allotted to the respective liquid crystal projectors 7a and 7b, which will be described later, a plurality of image correction units 5a and 5b serving as image correction means for correcting the split image signals output from the image splitter 13 on the basis of the image correction data supplied from the PC 3, a plurality of liquid crystal projectors 7a and 7b responsible for respective three (RGB) primary colors and serving as an image display device and image display means for projecting image data output from the respective image correction units 5a and 5b, a screen 8 serving as an image display device and image display means for displaying the images projected by the liquid crystal projectors 7a and 7b, and a CCD camera 9 serving as image capture means for capturing an image displayed on the screen 8.

The PC 3 includes, at least, an image input board 32 for inputting, to the PC 3, a digital image signal output from the CCD camera 9, a processing unit 30 serving as analysis means for calculating image correction data on the basis of the image signal input via the image input board 32 by executing the image correction data calculation program and also executing the operating system and other calculation processings, a correction data transfer board 33 for transferring gamma correction data, which is image correction data calculated by the processing unit 30, to the image correction units 5a and 5b, and a graphic board 31 serving as image output means for outputting, under the control of the processing unit 30, an RGB analog signal in a VGA format to an image splitter 13.

The projection system 11A is formed by the PC 3, the image splitter 13, the image correction units 5a and 5b, the liquid crystal projectors 7a and 7b, and the screen 8.

The details of the processing unit 30 are similar to those shown in FIG. 1B.

Figure 10:
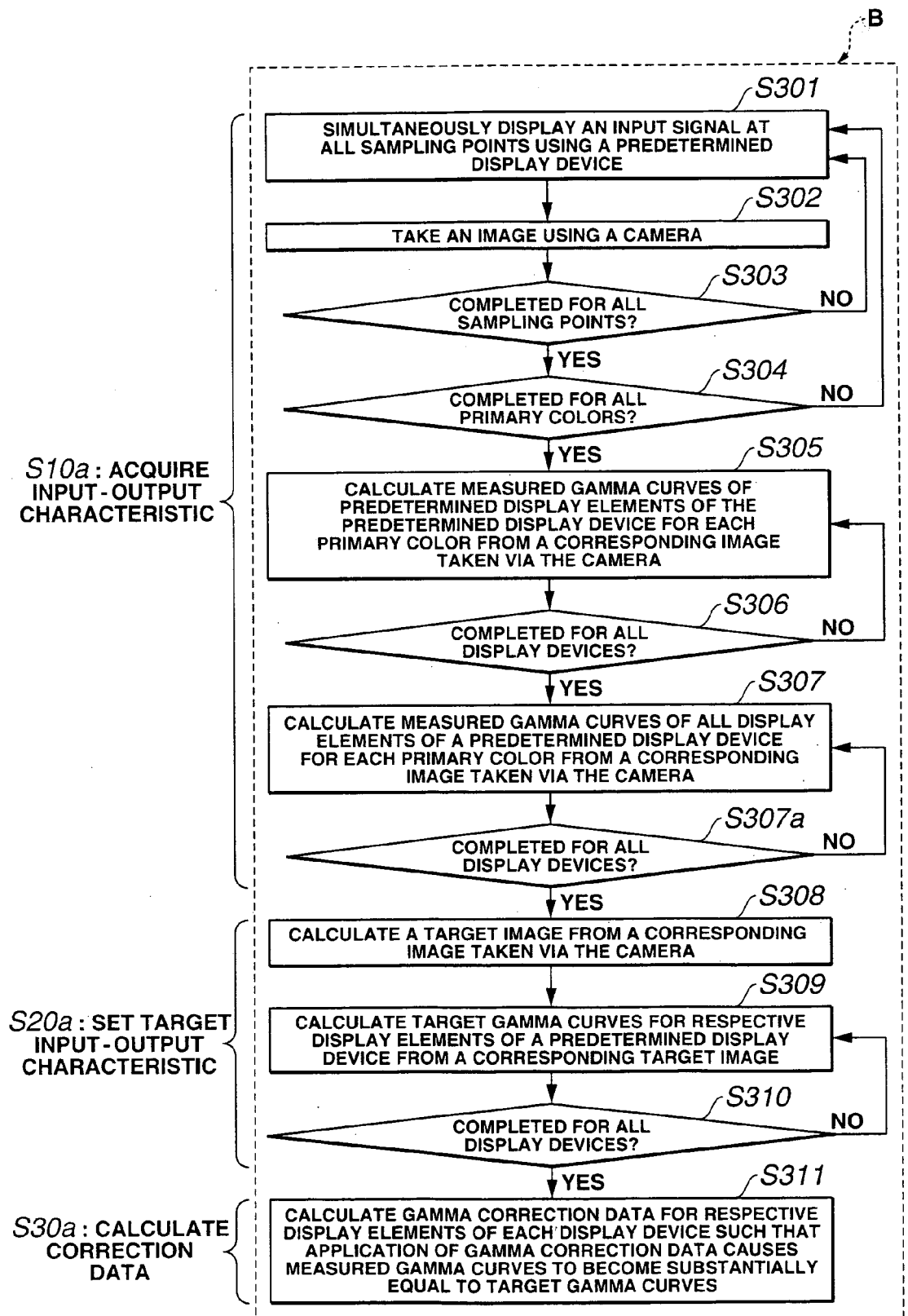
FIG. 10 is a flow chart showing an image correction data calculation method implemented by the image correction data calculator according to the second embodiment of the present invention.

An image correction data calculation method implemented by the image correction data calculator 1A constructed in the above-described manner is described below based on FIG. 9 and referring to FIGS. 10 and 12. FIG. 10 is a flow chart showing the image correction data calculation method implemented by the image correction data calculator according to the second embodiment of the present invention.

The image correction data calculator 1A produces gamma correction data, that is, image correction data by performing a process including three main steps (S10a, S20a, and S30a), as in the first embodiment.

In step S10a, a gamma characteristic at each display element is acquired for each primary color and for each projector.

In step S20a, a target gamma characteristic at each display element is set for each primary color and for each projector.

In step S30a, gamma correction data for each display element is calculated by the PC 3 serving as processing means, for each primary color and for each projector.

A process in step S10a of acquiring the gamma characteristic at each display element for each primary color and for each of liquid crystal projectors 7a and 7b is described below.

If input signal values of three RGB primary colors applied to the liquid crystal projectors 7a and 7b are expressed as (R, G, B), sampling points for each primary color are given as follows.

That is, input signal values described below are selected as measurement sampling points for primary color R: (0, 0, 0), (16, 0, 0), (32, 0, 0), (48, 0, 0), (64, 0, 0), (80, 0, 0), (96, 0, 0), (112, 0, 0), (128, 0, 0), (144, 0, 0), (160, 0, 0), (176, 0, 0), (192, 0, 0), (208, 0, 0), (224, 0, 0), (240, 0, 0), and (255, 0, 0).

For primary color G, input signal values described below are selected as measurement sampling points: (0, 0, 0), (0, 16, 0), (0, 32, 0), (0, 48, 0), (0, 64, 0), (0, 80, 0), (0, 96, 0), (0, 112, 0), (0, 128, 0), (0, 144, 0), (0, 160, 0), (0, 176, 0), (0, 192, 0), (0, 208, 0), (0, 224, 0), (0, 240, 0), and (0, 255, 0).

For primary color B, input signal values described below are selected as measurement sampling points: (0, 0, 0), (0, 0, 16), (0, 0, 32), (0, 0, 48), (0, 0, 64), (0, 0, 80), (0, 0, 96), (0, 0, 112), (0, 9, 128), (0, 0, 144), (0, 0, 160), (0, 0, 176), (0, 0, 192), (0, 0, 208), (0, 0, 224), (0, 0, 240), and (0, 0, 255).

For each of the measurement sampling points described above, a test image is produced in advance for each of the liquid crystal projectors 7a and 7b such that it has a signal level equal to the measurement sampling point at all display elements (or at predetermined display elements), and stored in the PC 3.

An image of a test pattern is captured as follows. First, initial gamma correction data that does not provide any correction effect at this initial stage are transferred from the PC 3 to respective image correction units 5a and 5b corresponding to the liquid crystal projectors 7a and 7b via the correction data transfer board 33.

Thereafter, a test image output from the PC 3 is split by the image splitter 13 and supplied to respective liquid crystal projectors 7a and 7b such that the same test image is applied to all liquid crystal projectors 7a and 7b. Thus, images are simultaneously displayed by all image display devices in accordance with the input signal at a predetermined sampling point (step S301).

The test image displayed on the screen 8 is captured by the CCD camera 9, and a resultant captured image is stored in the PC 3 via the image input board 32 of the PC 3 (step S302).

In the next step (S303), it is determined whether the process described above is completed for all sampling points. If the process is not completed, steps S301 to S303 are repeated, changing the sampling point, until the process is completed for all sampling points.

When it is determined in step S303 that the image has been captured for all sampling points, it is further determined (in step S304) whether the process is completed for all primary colors. If the process is not completed, steps S301 to S304 are repeated, changing the primary color, until the process is completed for all primary colors.

After completion of acquiring test images for all sampling points and for all primary colors, the processing unit 30 of the PC 3 determines the gamma characteristics of predetermined display elements of each of the projectors 7a and 7b for each primary color, on the basis of the captured image stored in the PC 3 (steps S305 and S306).

Thereafter, from the gamma characteristics of the predetermined display elements, the gamma characteristics of all display elements are determined for each primary color by means of four point interpolation, spline interpolation, or extrapolation, and resultant gamma characteristics are stored in the PC 3 (steps S307 and S307a).

Thereafter, a target gamma characteristic of each display element is set (calculated) of each of RGB colors in each of the liquid crystal projectors 7a and 7b, in a similar manner as in the first embodiment described above (steps S308 to S310 in main step S20a).

In some multiprojection systems 11A, image display areas of the image display units, onto which images are projected by the respective projectors 7a and 7b, do not overlap but are separated by physical boundaries (such as joints or frames of the screen 8). In such a multiprojection system, when the target image is calculated simply by passing the captured image signal through the lowpass filter, the luminance information of the physical boundaries, which are not parts of the image projected by the liquid crystal projectors 7a and 7b, exerts an influence on the displayed image. In this case, the target image is not correct in areas close to the physical boundaries. To avoid the above problem, in the calculation of the target image, it is necessary to detect the physical boundary areas in the captured image and pass the captured image signal through the lowpass filter such that parts of the signal corresponding to the physical boundary areas are not passed through the lowpass filter.

In some cases, there can be a slight difference in chromiticity of primary colors among the plurality of liquid crystal projectors 7a and 7b. Such a difference causes a difference in output color even when the RGB ratios are adjusted to be equal in the above-described manner. Such a difference can be deleted by setting separately the different RGB ratios for the respective liquid crystal projectors 7a and 7b such that white obtained by additively mixing primary colors becomes equal in chromaticity for all liquid crystal projectors 7a and 7b, and then setting target gamma characteristics on the basis of the RGB ratios determined in the above-described manner, and finally calculating the image correction data. Use of the image correction data obtained in the above-described manner allows elimination of color differences among image display areas.

By taking the image of each of the RGB primary colors using the CCD camera 9 attached with a white balance adjustment filter, it is possible to determine the RGB ratio for each projector such that the color differences among the image display areas are minimized. If the white balance adjustment filter has a characteristic equivalent or similar to luminous efficacy of a human eye, high accuracy can be achieved in the white balance adjustment.

In the next step S30a, the process of determining the gamma correction data at each display element of each RGB primary color in each of the plurality of liquid crystal projector 7a and 7b is performed in basically the same manner as in the first embodiment described above (step S311). That is, the processing unit 30 of the PC 3 calculates the gamma correction data for each display element of each of the liquid crystal projectors 7a and 7b such that the measured gamma curve becomes equal to the target gamma curve.

(Use of Monochrome Camera in the Second Embodiment)

Figure 11:
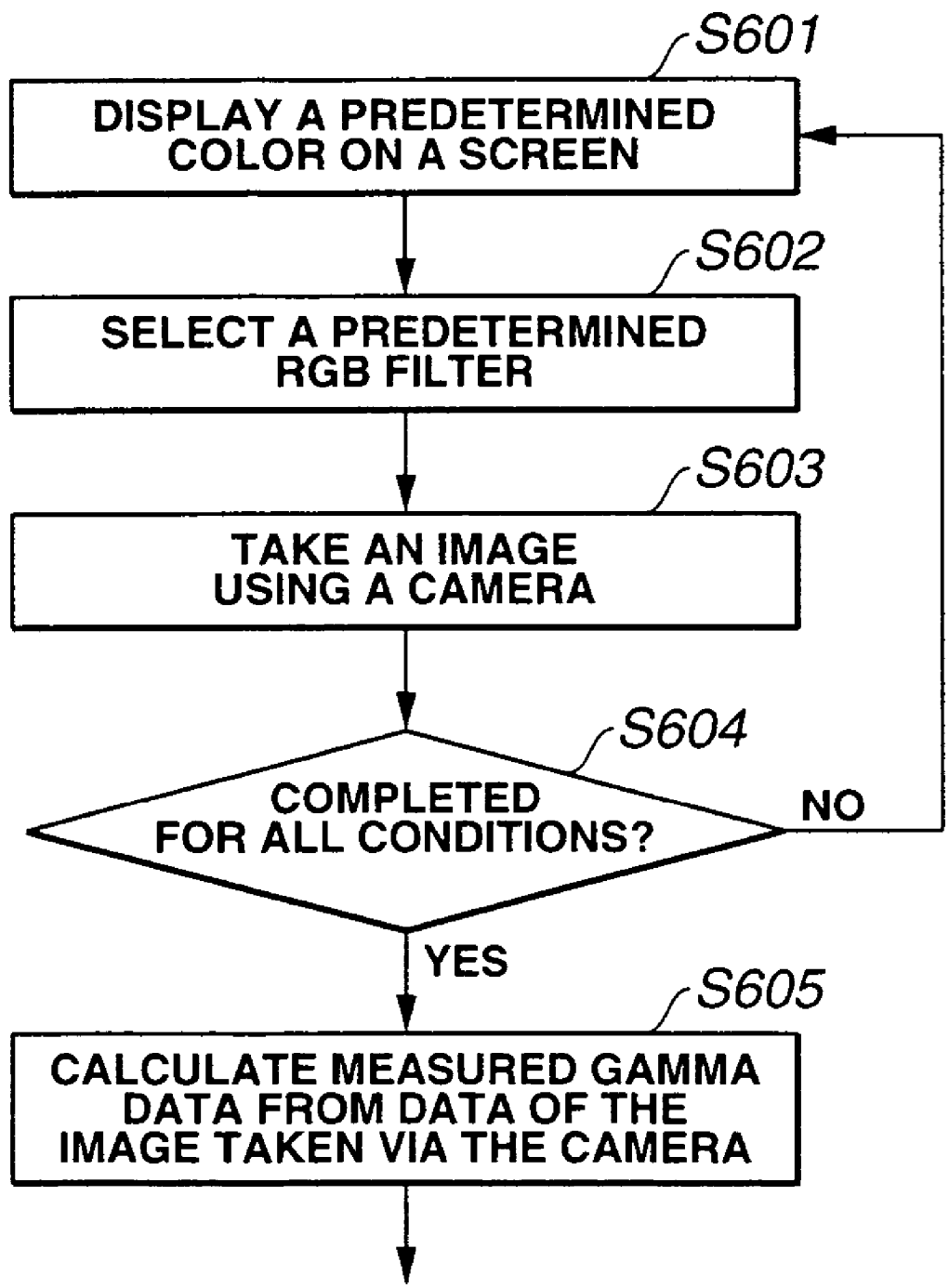
FIG. 11 is a flow chart showing a process of acquiring measured gamma characteristics using a filter properly selected for each of RGB colors, in the image correction data calculator according to the second embodiment of the present invention.

In the second embodiment described above, the color CCD camera 9 is used. Instead of the color CCD camera 9, a monochrome CCD camera may be used in implementation of the image correction data calculation method. In this case, the process is performed as shown in FIG. 11. FIG. 11 is a flow chart showing a process of acquiring measured gamma characteristics using different filters for respective RGB colors, in the image correction data calculator according to the second embodiment of the present invention.

Displayed images can be captured accurately and clearly, if a monochrome CCD camera 9 attached with a color filter corresponding to one of primary colors is used, and the image is captured a plurality of times such that a different color filter corresponding to a different primary color is used each time the image is captured. By using color filters that can separate RGB primary colors from each other, it is possible to more accurately acquire the gamma characteristics for each of RGB primary colors.

The process is described in further detail below.

First, a predetermined color (one of RGB primary colors with a predetermined gray level) is displayed on the screen (step S601), and a color filter corresponding to the displayed primary color is used (step S602).

An image of the displayed primary color is captured by the CCD camera 9 via the selected color filter, and resultant image data is stored in the PC 3 (step S603).

The processing unit 30 of the PC 3 determines whether capturing of the image is completed (for all gray levels and for all RGB colors) (step S604). If the capturing of the image is not completed, steps 601 to S604 described above are repeated. If the capturing of the image is completed, gamma characteristic data is calculated on the basis of the acquired images (step S605).

The process after acquisition of the measured gamma characteristic data is performed in a similar manner as in steps S20a and S30a described above with reference to FIG. 10.

(Use of White Balance Filter in the Second Embodiment)

Figure 12:
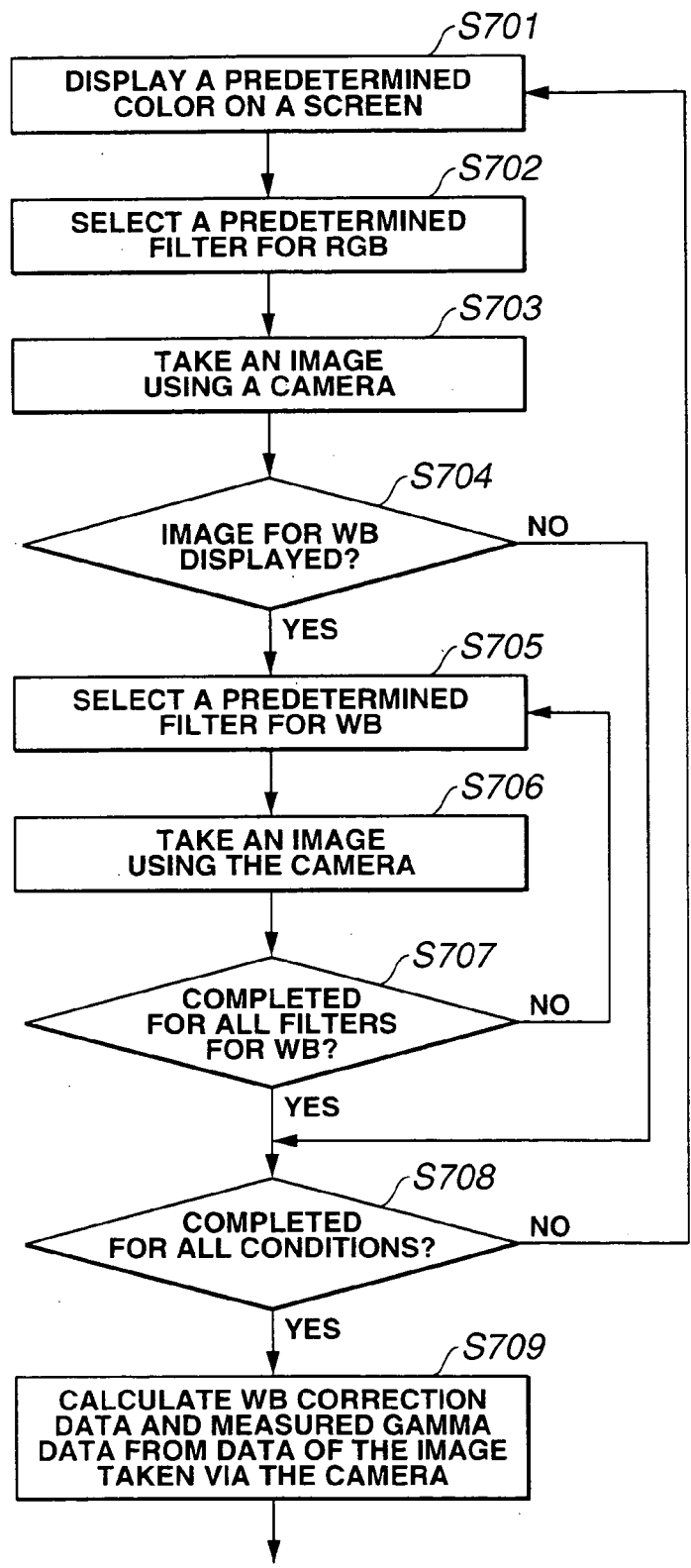
FIG. 12 is a flow chart showing a process of acquiring white balance data and measured gamma characteristics by using white balance adjustment filters, in the image correction data calculator according to the second embodiment of the present invention.

FIG. 12 is a flow chart showing a process of acquiring white balance data and measured gamma characteristics by using a white balance adjustment filter, in the image correction data calculator according to the second embodiment of the present invention.

In FIG. 12, the PC 3 supplies a predetermined color (one of RGB primary colors with a predetermined gray level) to the liquid crystal projectors 7a and 7b thereby displaying the predetermined color on the screen (step S701). The PC 3 specifies a filter corresponding to the displayed primary color to be used (step S702). An image of the displayed primary color is captured by the CCD camera 9 via the specified filter, and resultant image data is stored in the PC 3 (step S703).

The PC 3 then determines whether the currently displayed image is a white balance (WB) measurement image (an RGB primary color image corresponding to a maximum input level or an input level of 0) (step S704). If a WB measurement image is currently displayed, the PC 3 issues a command to use a WB filter (step S705). Then, an image of the displayed primary color is captured by the CCD camera 9 via the specified filter, and resultant image data is stored in the PC 3 (step S706).

The PC 3 determines whether the capturing of the image using the WB filter is completed (step S707). If the capturing of the image is not completed, steps S705 to S707 described above are repeated.

If it is determined in step S707 that the capturing of the image using the WB filter is completed, or if it is determined in step S704 that the currently displayed image is not a WB measurement image, then it is determined whether capturing of the image of the predetermined color is completed (for all RGB primary colors and for all gray levels) (step S708). If the capturing of the image is not completed, steps S701 to S708 described above are repeated.

If it is determined in step S708 that the capturing of the image is completed, the PC 3 calculates the white balance adjustment data and the gamma characteristic data from the acquired image data (step S709).

The image correction data calculator according to the second embodiment operates in the above-described manner to acquire necessary gamma correction data.

In the second embodiment described above, the gamma correction data is determined for each display element. Alternatively, in order to perform the process in a shorter time using a less memory capacity, the display screen area may be divided into blocks each including, for example, 4×4 display elements, and the gamma correction data may be determined for each block such that the same gamma correction data is applied to all display elements in each block. In this case, it is desirable that the block size be varied adaptively depending on the degree of nonuniformity of luminance. That is, a small block size is used for an area where luminance nonuniformity is large, while a large block size is used for an area where luminance nonuniformity is small. In particular, when the multiprojection system is of the seamless type, it is desirable that the gamma correction data be determined for each display element in overlapping areas but, in the other areas, gamma correction data be determined for each block. This makes it possible to achieve high correction accuracy and thus output a high-uniformity image in a short time using a low-capacity memory.

Alternatively, only the gamma correction data for predetermined display elements may be calculated on the basis of measured values, and the gamma correction data for the other display elements may be determined by means of four-point interpolation, spline interpolation, or extrapolation and by using the gamma correction data which is marginally located to display elements of which interpolation data is already calculated. This allows reductions in the measurement time and the processing time needed to calculate the gamma correction data.

(Projection System Using Image Correction Data According to the Second Embodiment)

The projection system 11A is capable of correcting an image using image correction data produced by the image correction data calculation method according to the second embodiment.

The image correction units 5a and 5b include a plurality of lookup tables (LUTs) for storing gamma correction data. One LUT is produced for a predetermined display position on the screen for each RGB primary color. Note that the expression "predetermined display position" is used to describe a display position at which the gamma correction data is determined, and thus the "predetermined display position" may be each of all display positions or the position of each block including a plurality of display elements.

First, the gamma correction data produced by processing unit 30 of the PC 3 for each display element of each RGB primary color, in each of the liquid crystal projectors 7a and 7b is transferred from the correction data transfer board 33 of the PC 3 to a corresponding LUT of the image correction units 5a and 5b.

Subsequently, a PC image signal is supplied as an input signal to the image splitter 13 from the graphic board 31 of the PC 3.

The image splitter 13 splits the given input signal into as many image signals as the number of liquid crystal projectors 7a and 7b, and supplies the resultant respective image signals to the corresponding image correction units 5a and 5b.

The image correction units 5a and 5b obtain gamma-corrected image signals by applying the gamma correction data to the input signals. The obtained image signals are supplied to the liquid crystal projectors 7a and 7b, which in turn project images onto the screen 8 in accordance with the received image signals.

In the above process, the PC image signal is converted to the output image data, using gamma correction data stored in LUTs corresponding to display positions on the screen for respective RGB primary colors in the image correction units 5a and 5b, such that nonuniformity of luminance at outputs of the projectors is eliminated for any input signal level of any RGB primary color, and thus the resultant displayed image has good uniformity in luminance and color.

In the second embodiment described above, images are captured using the camera to acquire measured gamma characteristics. However, when an image projected by a plurality of projectors is captured by a camera, if there is a large luminance difference among projectors, flaring can cause measured values to become incorrect in some area. This problem can be solved by a technique described below in a third embodiment.

(Third Embodiment)

Figure 13:
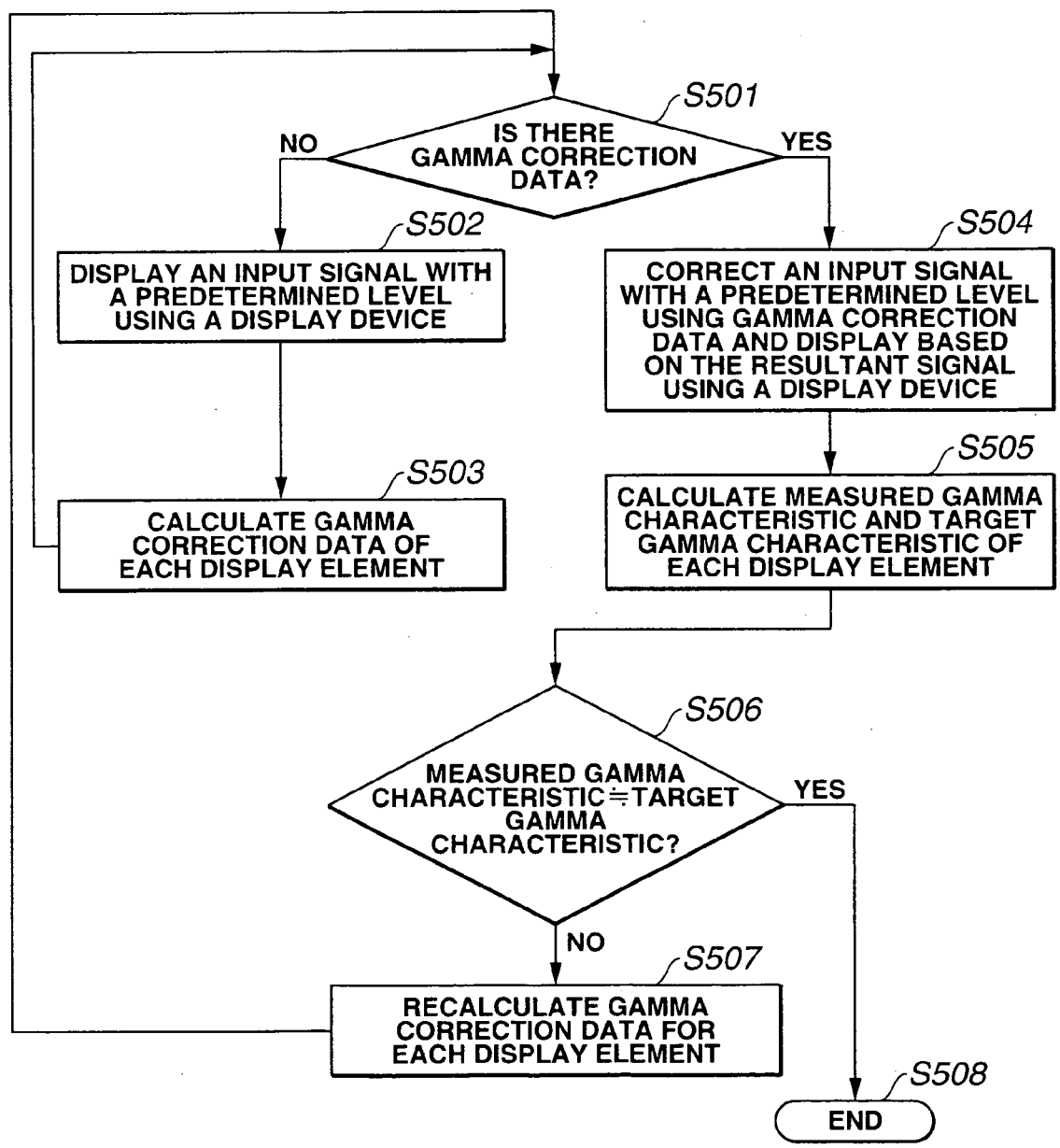
FIG. 13 is a flow chart showing a process of producing optimum gamma correction data according to a third embodiment of an image correction data calculation method of the present invention.

FIG. 13 is a flow chart showing a process of calculating optimum gamma correction data according to a third embodiment of an image correction data calculation method of the present invention. A image correction data calculator used in this third embodiment is the same in terms of structure as that shown in FIG. 9, and thus FIG. 9 is referred to, as required, in the following description.

At the beginning of the process, it is determined whether there is gamma correction data (step S501). Because there is no gamma correction data at this initial stage, gamma correction data is calculated in a similar manner as in the second embodiment described above. That is, an input signal with a predetermined signal level is displayed on the display (step S502), and gamma correction data for each display element is calculated (step S503). Thereafter, the process returns to step S501.

At this time, it is determined in step S501 that there is acquired gamma correction data. Thus, the input signal with the predetermined level is corrected using the gamma correction data and displayed on the display (step S504). The display image is then captured into the PC 3 via the CCD camera 9, and measured gamma characteristics and target gamma characteristics are calculated (step S505).

Subsequently, it is determined whether the measured gamma characteristics are nearly the same as the target gamma characteristics (more specifically, for example, it is determined whether the differences between the measured characteristics and the target gamma characteristics are within a predetermined allowable range) (step S506). If they are not nearly the same, the gamma correction data is re-calculated for each display element on the basis of the measured gamma characteristics, the target gamma characteristics, and the gamma correction data determined in previous steps (step S507), and the process returns to step S501.

The above-described process is performed repeatedly until it is determined in step S506 that the measured gamma characteristics are nearly the same as the target gamma characteristics. If it is determined in step S506 that the measured gamma characteristics are nearly the same as the target gamma characteristics, the process is ended (step S508).

When the process including the step of capturing the image using the camera to acquire the measured gamma characteristic is iterated, the difference in luminance among the plurality of projectors gradually decreases, and finally very accurate image correction data can be obtained without being influenced significantly by flaring or the like of the camera.

In the third embodiment described above, the image correction data is re-calculated until the measured gamma characteristics become nearly the same as the target gamma characteristics. Alternatively, the re-calculation may be terminated when the number of iterations reaches a predetermined upper limit.

Figure 14:
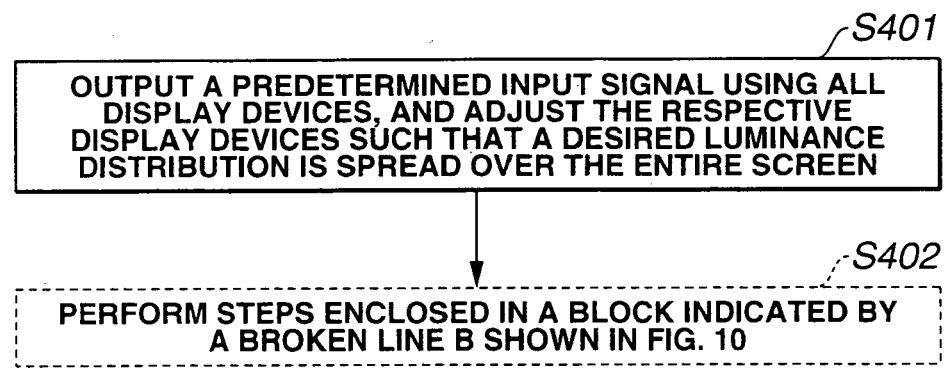
FIG. 14 is a flow chart showing another example of a process of acquiring measured gamma characteristics based on the image correction data calculation method according to the third embodiment of the present invention.

FIG. 14 is a flow chart showing another example of a process of acquiring measured gamma characteristics based on the image correction data calculation method according to the third embodiment of the present invention.

In this example, as shown in FIG. 14, when the PC 3 acquires the measured gamma characteristics, the projectors are first adjusted such that the luminance difference is reduced to a certain degree (step S401), and then steps described in a block enclosed in a broken line, B, in FIG. 10 are performed to acquire the measured gamma characteristics (step S402).

Even in this method in FIG. 14, the same effect as the one explained in the third embodiment, in which calculations are repeated by feeding back the previous image correction data, is obtained.

An embodiment of a projection system capable of correcting an image using image correction data obtained in the above-described manner is described below.

(Fourth Embodiment)

Figure 15:
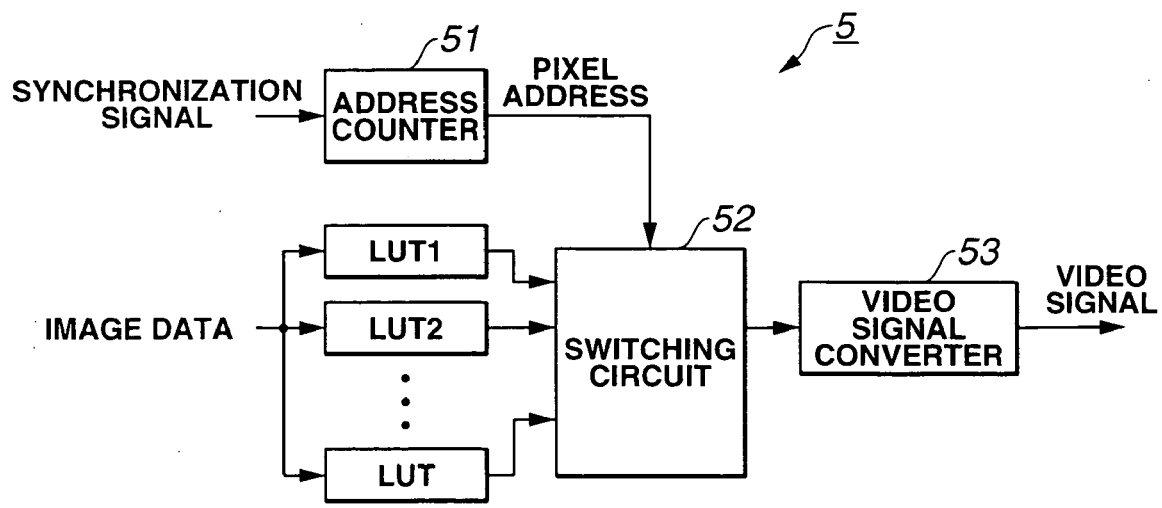
FIG. 15 is a block diagram showing an image correction unit used in a projection system according to a fourth embodiment of the present invention.

FIG. 15 is a block diagram showing an image correction unit used in a projection system according to a fourth embodiment of the present invention.

An input signal includes a synchronization signal and image data.

The image correction unit 5 includes an address counter 51 for counting the synchronization signal thereby calculating a pixel address (address of a display element) and outputting the calculated address, a plurality of lookup tables LUT1 to LUTn for storing in advance image correction data and outputting corrected image data produced in response to receiving image data, a switching circuit 52 serving as a switching unit for selecting one of lookup tables LUT1 to LUTn depending on the pixel address received from the address counter 51 and outputting data supplied from the selected lookup table, and a video signal converter 53 serving as video signal conversion means for converting the output from the switching circuit 52 into a video signal adapted to the liquid crystal projector 7.

The plurality of lookup tables LUT1 to LUTn are produced such that there is one lookup table corresponding to each of display elements forming the output screen.

The image correction unit 5 operates as follows.

As described above, the synchronization signal of the input image signal is input to the address counter 51 of the image correction unit 5, and the address counter 51 outputs a pixel address determined on the basis of the synchronization signal.

The image data of the input image signal is simultaneously input to the plurality of lookup tables LUT1 to LUTn whose outputs are connected to the switching circuit 52.

The switching circuit 52 selects one of lookup tables LUT1 to LUTn corresponding to the pixel address output from the address counter 51 and outputs (corrected) image data supplied from the selected lookup table to the video signal converter 53.

The video signal converter 53 converts the image data received from the switching circuit 52 into an analog video signal and outputs the resultant analog video signal to the liquid crystal projector.

(Fifth Embodiment)

Figure 16:
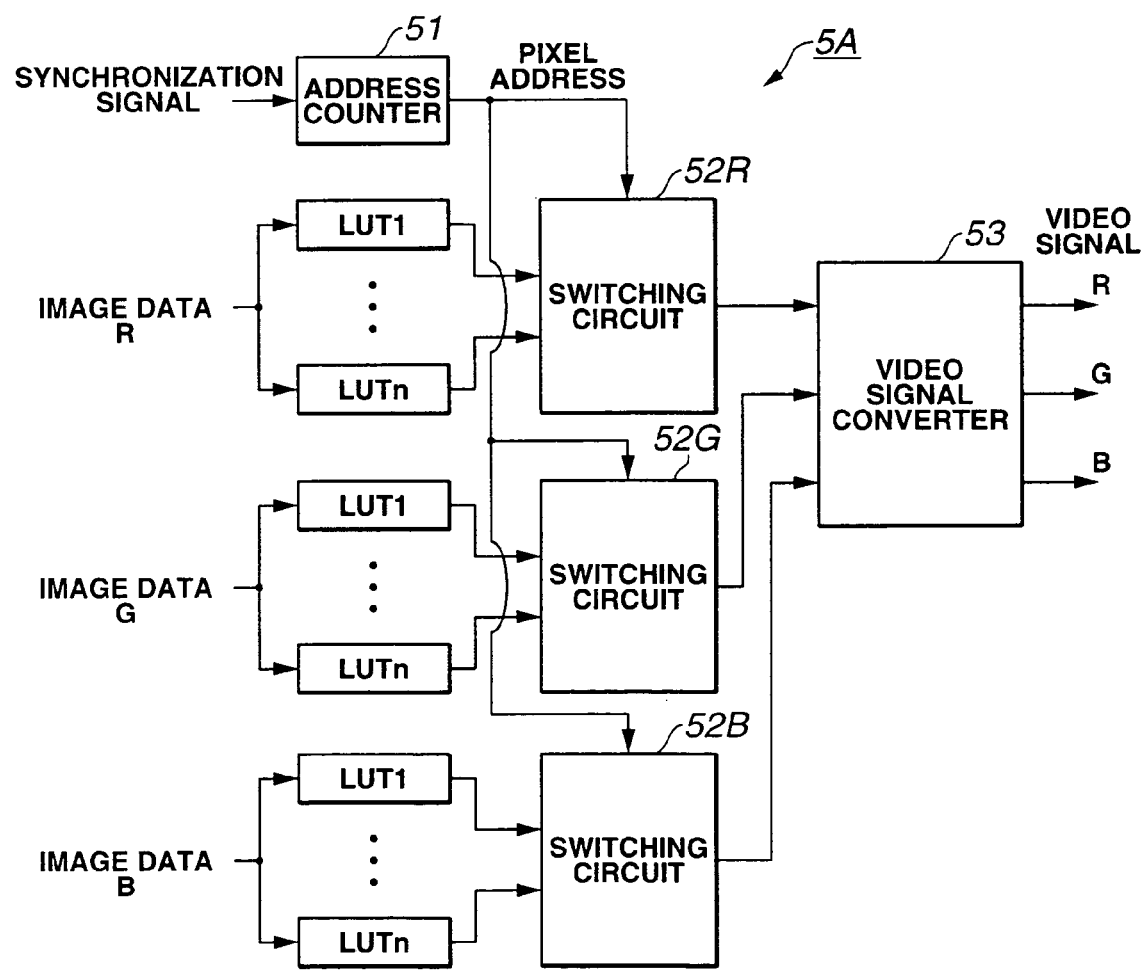
FIG. 16 is a block diagram showing an image correction unit used in a projection system according to a fifth embodiment of the present invention.

FIG. 16 is a block diagram showing an image correction unit used in a projection system according to a fifth embodiment of the present invention.

As shown in FIG. 16, the image correction unit 5A includes an address counter 51 for counting a synchronization signal of an input image signal thereby calculating a pixel address and outputting the calculated address, a plurality of lookup tables LUT1 to LUTn provided for respective RGB primary colors, for storing in advance image correction data associated with respective RGB primary colors and for producing and outputting corrected image data in response to receiving the respective RGB color components of input image data, switching circuits 52R, 52G, and 52B provided for respective RGB primary colors, each serving to select one of lookup tables LUT1 to LUTn depending on the pixel address output from the address counter 51 and output data supplied from the selected lookup table, and an RGB video signal converter 53 for converting the image data output from the respective switching circuits 52R, 52G, and 52B into RGB video signals adapted to the liquid crystal projector 7.

In this image correction unit 5A, by operating in parallel the lookup tables LUT1 to LUTn provided for respective RGB primary colors and the switching circuits 52R, 52G, and 52B provided for respective RGB primary colors, it is possible to output an image with corrected luminance and color uniformity.

In the specific example described above, lookup tables LUT1 to LUTn are provided for respective display elements. Alternatively, lookup tables may be provided for respective blocks each including a plurality of display elements. This allows a large reduction in memory space needed to store lookup tables LUT1 to LUTn, and thus a reduction in production cost of the apparatus can be achieved.

In the specific example described above, the switching circuits 52R, 52G, and 52B are connected to the respective lookup tables LUT1 to LUTn such that a necessary lookup table is selected from the lookup tables LUT1 to LUTn and only data provided by the selected lookup table is output via the switching circuits 52R, 52G, and 52B. Alternatively, the plurality of lookup tables LUT1 to LUTn may be controlled such that only necessary data is output from one of the lookup tables LUT1 to LUTn to the switching circuits 52R, 52G, and 52B.

(Sixth Embodiment)

Figure 17:
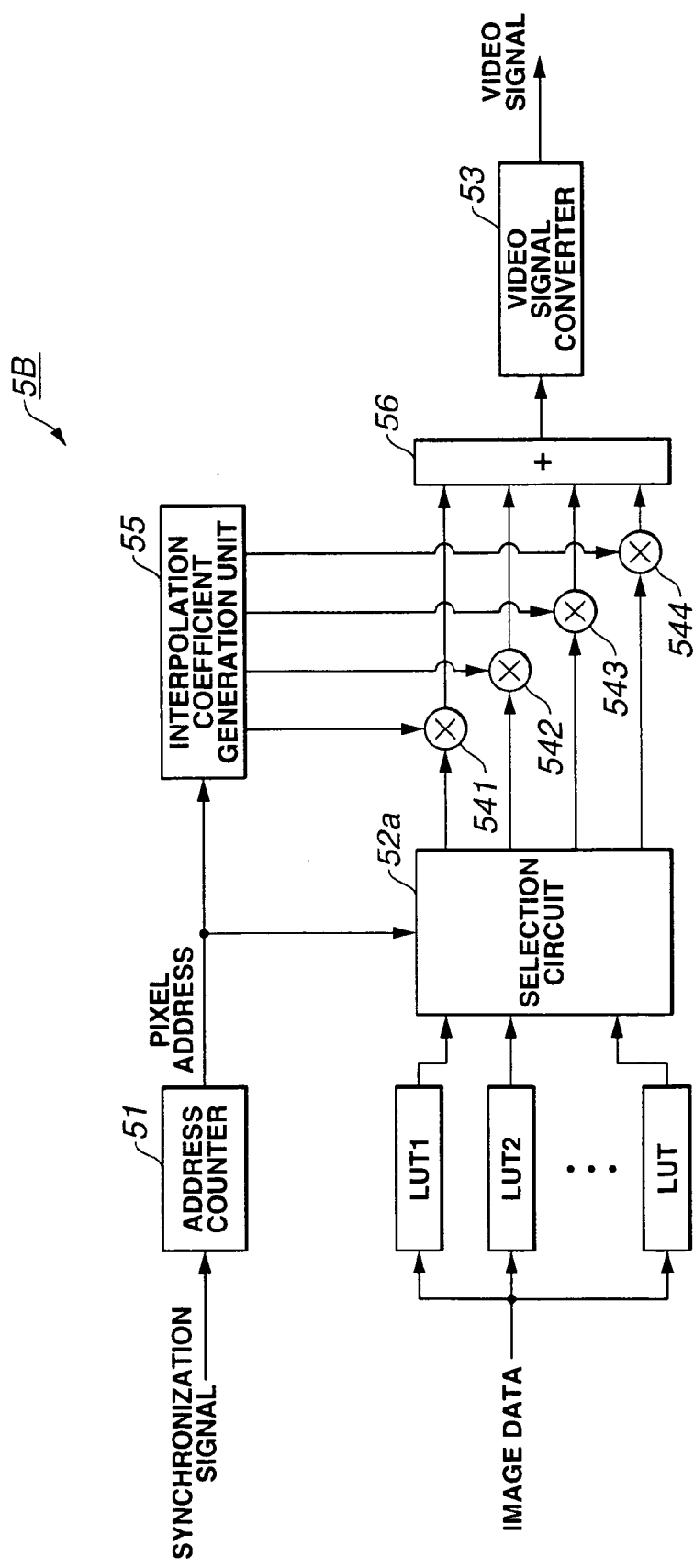
FIG. 17 is a block diagram showing an image correction unit used in a projection system according to a sixth embodiment of the present invention.
Figure 18:
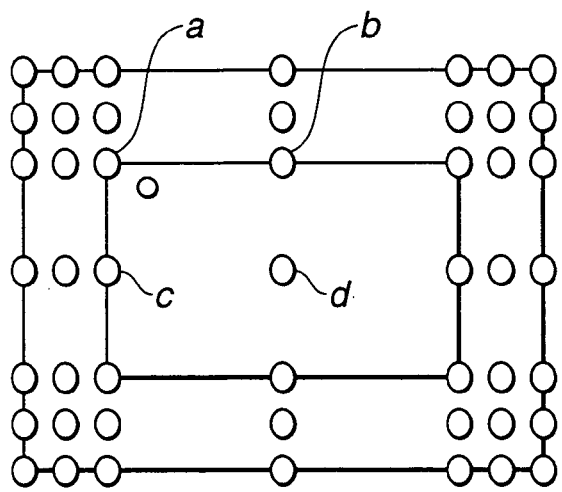
FIG. 18 is a block diagram showing an arrangement of lookup tables LUT1 to LUTn in an image correction unit of a projection system according to the sixth embodiment of the present invention.

Referring to FIGS. 17 and 18, a sixth embodiment of the present invention is described below. FIG. 17 is a block diagram showing an image correction unit used in a projection system according to a sixth embodiment of the present invention. FIG. 18 is a block diagram showing an arrangement of lookup tables LUT1 to LUTn in an image correction unit of a projection system according to the sixth embodiment of the present invention.

As shown in FIG. 17, the image correction unit 5B includes an address counter 51 for counting a synchronization signal of an input image signal thereby calculating a pixel address and outputting the calculated address, a plurality of lookup tables LUT1 to LUTn for storing in advance image correction data and outputting corrected image data created in response to reception of image data of an input image signal, a switching circuit 52a serving as a selection unit for selecting one of lookup tables LUT1 to LUTn depending on the pixel address received from the address counter 51 and outputting data supplied from the selected lookup table, and an interpolation coefficient generation unit 55 serving as a coefficient generation unit for generating an interpolation coefficient depending on the pixel address received from the address counter 51, a plurality of (four, in this specific example) multipliers 541 to 544 serving as coefficient operation units and multipliers for multiplying the output of the selection circuit 52a by the interpolation coefficient generated by the interpolation coefficient generation unit 55, an adder 56 for adding together the outputs of the multipliers 541 to 544 thereby producing and outputting corrected image data, and a video signal converter 53 for converting the output of the adder 56 into a video signal adapted to the image display device.

The plurality of lookup tables LUT1 to LUTn are provided such that there is one lookup table for each of areas defined on the output screen. In this specific embodiment, 49 areas are defined on the output screen, at 7×7 lattice points as represented by open circles in FIG. 18.

Image data of an input image signal is simultaneously input to all lookup tables LUT1 to LUTn. The outputs of the lookup tables LUT1 to LUTn are connected to the selection circuit 52a.

The selection circuit 52a selects outputs of four LUTs corresponding to locations surrounding a display element specified by a pixel address output from the address counter 51, and supplies the selected outputs to respective four multipliers 541 to 544. For example, if a display element at a location denoted by a solid circuit in FIG. 18 is specified by a pixel address output from the address counter 51, the selection circuit 52a selects LUTs corresponding to locations a, b, c, and d surrounding the above display element and supplies the outputs of the LUTs to the respective four multipliers 541 to 544.

The interpolation coefficient generation unit 55 generates interpolation coefficients according to the pixel address output from the address counter 51. In the specific example shown in FIG. 18, the interpolation coefficients are used to interpolate the image data for the display element at the location indicated by the solid circle based on the image data at the locations a, b, c, and d. The interpolation coefficients may be normalized. The multipliers 541 to 544 multiply the outputs of the selected LUTs by the respective interpolation coefficients.

After the image data are multiplied by the interpolation coefficients by the multipliers 541 to 544, the resultant image data are added together by the adder 56 and converted into a video signal by the video signal converter 53. The resultant video signal is supplied to the liquid crystal projectors 7a and 7b. In accordance with the received video signal, the liquid crystal projectors 7a and 7b project an image on the screen 8.

By performing the process in the above-described manner, image correction data associated with each display element specified by a pixel address is interpolated and calculated with respect to the location of the display element by means of interpolation using image correction data supplied from LUTs.

In the case of a color image, circuits similar to that described above are provided for respective RGB primary colors, and the process is performed in parallel by the circuits. The resultant image output via the process described above has luminance and color uniformity corrected.

In the specific example described above, LUTs are provided corresponding to respective 49 lattice points wherein the point-to-point distance is set to be greater in a central area and smaller in an peripheral area of the screen. It means, by setting the point-to-point distance to be smaller in an area where the measured gamma characteristic varies greatly, it becomes possible to efficiently reduce correction errors.

Although in the sixth embodiment described above, LUTs are set at respective 49 lattice points, the number of lattice points is not limited to 49. For example, LUTs may be set at respective 25 points (5×5 lattice points). This results in a large reduction in memory space needed to store lookup tables LUTs, and thus a reduction in production cost of the apparatus can be achieved. Of course, the number of lattices is not limited to these numbers.

(Seventh Embodiment)

Figure 19:
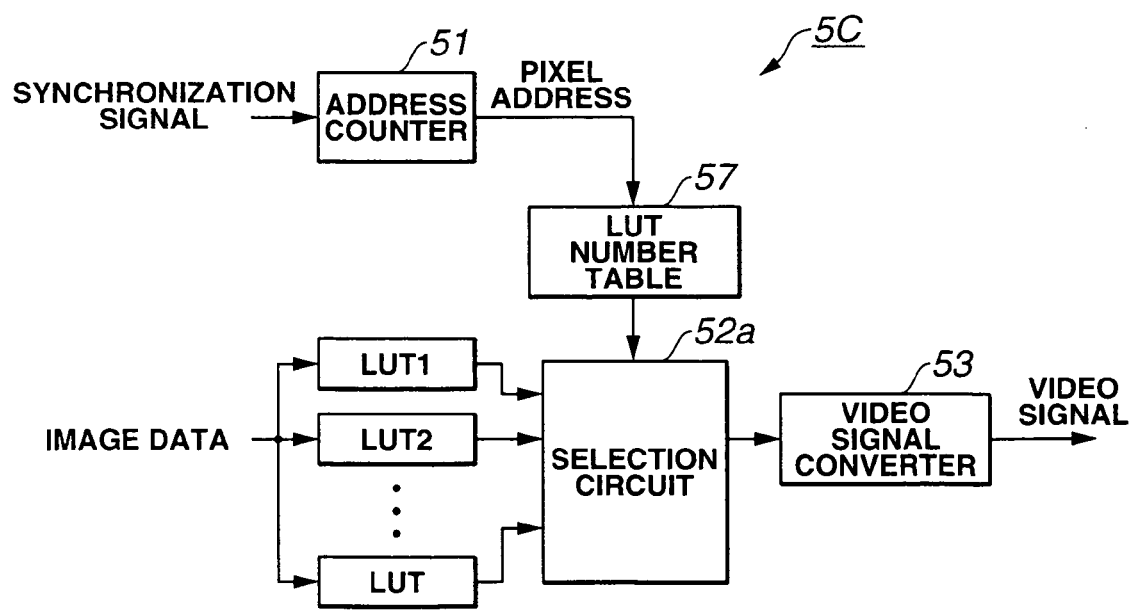
FIG. 19 is a block diagram showing an image correction unit used in a projection system according to a seventh embodiment of the present invention.
Figure 20:
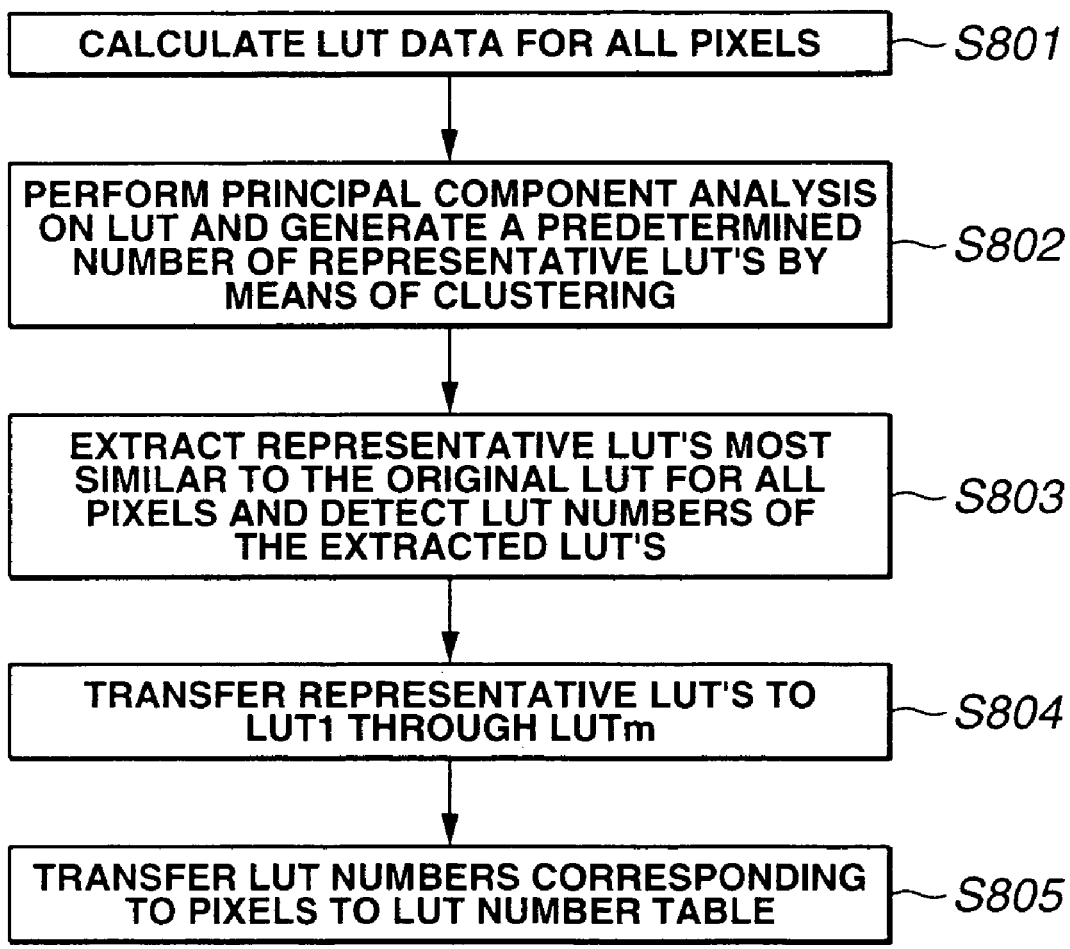
FIG. 20 is a flow chart showing a process of calculating data to be stored in LUTs disposed in the image correction unit of the projection system according to the seventh embodiment of the invention.

Referring to FIGS. 19 and 20, a seventh embodiment of the present invention is described below. FIG. 19 is a block diagram showing another image correction unit used in a projection system according to a seventh embodiment of the present invention.

The image correction unit 5C includes an address counter 51 for counting a synchronization signal of an input image signal thereby calculating a pixel address and outputting the calculated address, a plurality of lookup tables LUT1 to LUTn, in which image correction data are stored in advance and output corrected image data produced in response to receiving image data of an input image signal, an LUT number table 57 for outputting a LUT number corresponding to a pixel address received from the address counter 51, a selection circuit 52a for selecting an LUT in accordance with the LUT number output from the LUT number table 57 and outputting image data supplied from the selected LUT, and a video signal converter 53 for converting the output of the selection circuit 52a into a video signal adapted to the image display device.

There are prepared as many lookup tables LUT1 to LUTn as predetermined. Herein, it is assumed that there are prepared 256 lookup tables LUT 1 to LUTn. That is, it is assumed herein that n=256. The LUT number table 57 stores data indicating which one of 256 lookup tables LUT1 to LUTn should be selected for a given pixel address.

The operation the image correction unit 5C is described below with reference to FIG. 20. FIG. 20 is a flow chart showing a process of calculating data to be stored in LUTs disposed in the image correction unit of the projection system according to the seventh embodiment of the invention.

First, image correction data is calculated for each of all display elements in a similar manner as described above with reference to the second embodiment (step S801). When the image correction data is determined for each of all display elements, if an output image is, for example, in the VGA format, as many LUT data as 640×480=307200 are calculated. When image correction data is determined for each block, the number of LUT data becomes smaller.

The LUT data are then subjected to principal component analysis and clustered into a predetermined number of groups. Via this process, for example, 256 representative LUT data are obtained, and an LUT number is assigned to each representative LUT data (step S802). The 256 representative LUT data are stored as table data in the respective 256 LUTs described above.

Then each of the 307200 LUT data is examined to determine which one of the clustered 256 LUTs each LUT data is closest to, and the corresponding LUT number is calculated (step S803).

The 256 LUT data determined in the above-described manner are then transferred to the corresponding lookup tables LUT1 to LUTn (step S804).

Subsequently, data indicating the LUT number of 307200 LUTs is transferred to the LUT number table 57 and LUT numbers are written in corresponding locations of the LUT number table 57 (step S805).

Thus, data written in LUTs and data written in the LUT number table are calculated.

A process of correcting an image is described below.

Image data of an input image signal is simultaneously input to all lookup tables LUT1 to LUTn. The outputs of the lookup tables LUT1 to LUTn are connected to the selection circuit 52a.

On the other hand, the synchronization signal of the input image signal is input to the address counter 51, and the address counter 51 outputs a pixel address determined on the basis of the synchronization signal. The resultant pixel address is input to the LUT number table 57. The LUT number table 57 outputs an LUT number corresponding to the received pixel address.

The selection circuit 52a selects an LUT corresponding to the LUT number received from the LUT number table 57, and the selection circuit 52a supplies the output of the selected LUT to the video signal converter 53.

In the case of a color image, circuits similar to that described above are provided for respective RGB primary colors, and the process is performed in parallel by the circuits. The resultant image output via the process described above has corrected luminance and color uniformity.

Although in the seventh embodiment described above, as many as 256 LUTs are used, a similar correction can be achieved using a less number of LUTs if LUT data are normalized, as described below in a first modification of the seventh embodiment.

(First Modification of the Seventh Embodiment)

Figure 21:
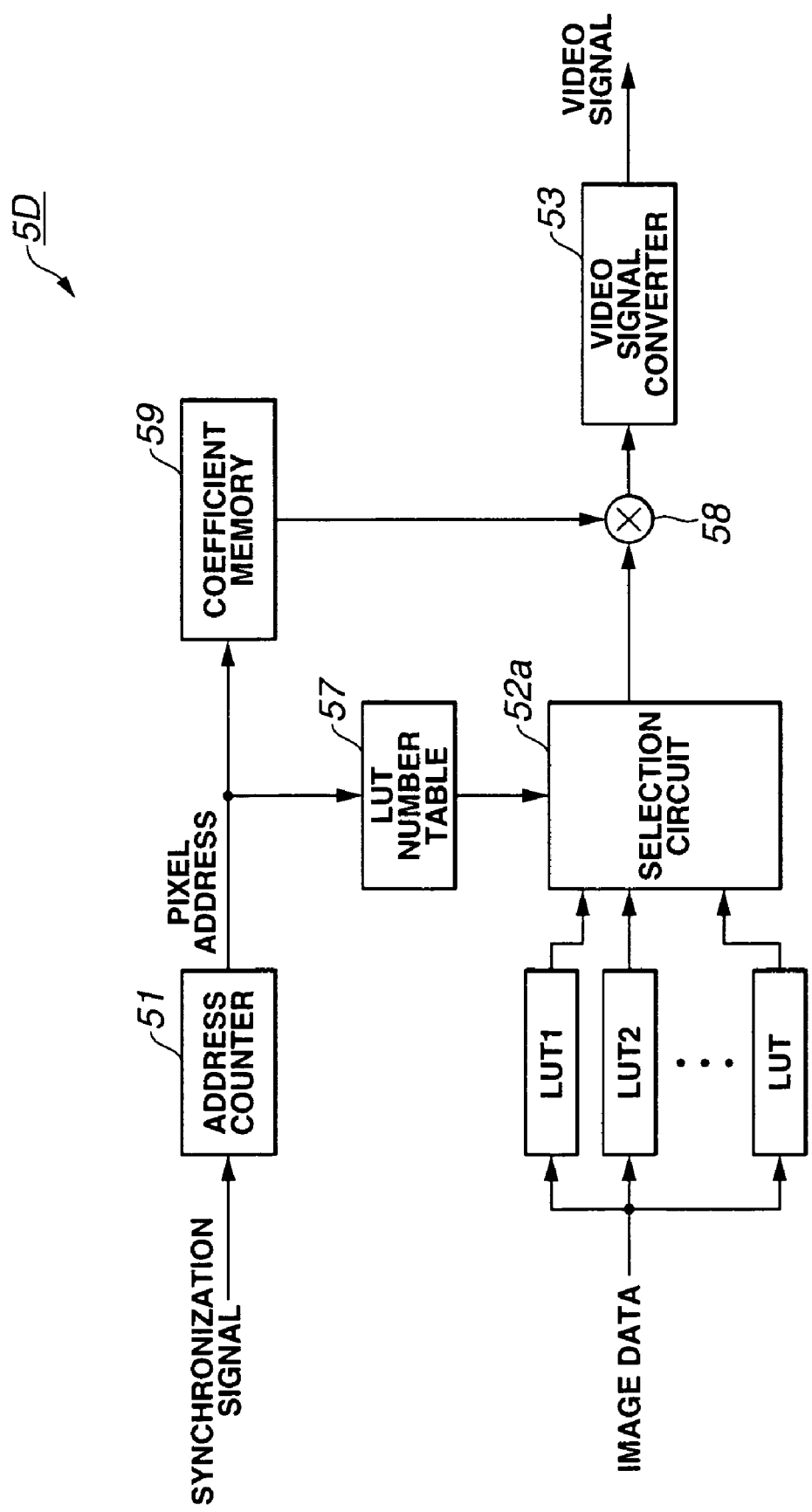
FIG. 21 is a block diagram showing a first modification of the image correction unit used in a projection system, according to the seventh embodiment of the present invention.

FIG. 21 is a block diagram showing a first modification of the image correction unit used in a projection system, according to the seventh embodiment of the present invention.

In this first modification, the image correction unit 5D includes, in addition to the compartments of the image correction unit 5C shown in FIG. 19, a coefficient memory 59 connected to the output of the address counter 51, for storing coefficients (ratios of original values to normalized values) depending on pixel addresses, and a multiplier 58 connected to the output of the selection circuit 52a, for multiplying the output of the selection circuit 52a by a coefficient output from the coefficient memory 59.

If handling of offset components of LUTs is performed in the outside of the LUTs, it becomes possible to achieve a similar correction effect using a still less number of LUTs, as described below in a second modification.

(Second Modification of the Seventh Embodiment)

FIG. 22 is a block diagram showing a second modification of the image correction unit used in a projection system, according to the seventh embodiment of the present invention.

In this second modification, the image correction unit 5E includes, in addition to the components of the image correction unit 5D shown in FIG. 22, an offset memory 61 serving as a constant memory connected to the output of the address counter 51, for storing a constant (offset), and an adder 60 connected to the output of the multiplier 58, for adding the constant (offset) output from the offset memory 61 to the output of the multiplier 58.

As described above, the offset memory 61 stores the constant indicating the difference between original values and values obtained after the offset is removed. Although the offset memory 61 stores only one constant in the specific example described above, the offset memory 61 may store a plurality of constants corresponding to particular positions on the screen.

The multiplier 58 or the adder 60 is not necessarily needed to be located at the stage following the selection circuit 52a, but may be disposed at the stage before the LUTs.

In the seventh embodiment described above, LUTs are calculated for all display elements. Alternatively, LUTs may be calculated for respective blocks each including a plurality of display elements. This results in a large reduction in memory space needed to store the LUT number table 57, and thus a reduction in production cost of the apparatus can be achieved.

As for each projector used in the embodiments described above, a transmissive liquid crystal projector, a reflective liquid crystal projector, a DLP projector using a digital micromirror device (DMD), or a similar projector may be employed.

The present invention is not limited to the details of the embodiments described above, but various modifications or applications are possible without departing from the spirit and scope of the invention.

INDUSTRIAL APPLICABILITY

As described above, the method and apparatus for calculating image correction data according to the present invention makes it possible to automatically and easily produce image correction data for use in reducing at least one of luminance nonuniformity and color nonuniformity over the entire input image displayed on the image display device.

The projection system according to the present invention is capable of displaying an image whose luminance nonuniformity and/or color nonuniformity are reduced over the entire input image displayed on the image display device, by using image correction data produced by the image correction data production method or the image correction data production apparatus.

The invention claimed is:

1. A method of calculating image correction data comprising:
acquiring, based on image data captured by an image capture section, an input-output characteristic at each of a plurality of display elements on a display screen of an image display section that includes at least one image display unit;
setting a target input-output characteristic to be obtained at each of the plurality of display elements by calculating the target input-output characteristic based on data of the acquired input-output characteristic; and
calculating image correction data to correct an input-output characteristic for an input image signal in accordance with locations of display elements on the screen, based on the acquired input-output characteristic and the target input-output characteristic for each of the display elements.

2. The method of calculating image correction data, according to claim 1, wherein calculating the target input-output characteristic comprises setting a maximum value and a minimum value of the target input-output characteristic to be obtained, and setting the target input-output characteristic between the minimum and maximum values to be an average value of the acquired input-output characteristics at positions over the screen.

3. The method of calculating image correction data, according to claim 2, wherein the maximum value of the target input-output characteristic is set such that a luminance distribution corresponding thereto is equal to a luminance distribution that is obtained when image data obtained by capturing an image display corresponded to a predetermined input signal at respective positions on the screen is passed through a lowpass filter.

4. The method of calculating image correction data, according to claim 2, wherein the minimum value of the target input-output characteristic is set such that a luminance distribution corresponding thereto is equal to a luminance distribution that is obtained when image data obtained by capturing an image display corresponded to a predetermined input signal at respective positions on the screen is passed through a lowpass filter.

5. A projection system comprising:
image output means for outputting image data to be displayed;
image correction means for correcting the image data output from the image output means in accordance with image correction data; and
image display means for displaying on a screen the image data corrected by the image correction means;
wherein the image correction means includes:
a plurality of lookup tables which store image correction data;
a lookup table number table for storing lookup table numbers in relation to corresponding positions on the screen;
a selection unit for selecting an effective lookup table from the plurality of lookup tables in accordance with a value output from the lookup table number table and for outputting corrected image data that has been corrected based on the image correction data stored in the selected effective lookup table; and
video signal output means for converting the corrected image data from the selection unit into a video signal adapted to the image display device;
wherein the plurality of lookup tables comprise a plurality of conversion tables that reflect a result of statistical processing on a plurality of image correction data over the screen of the image display means; and
wherein the lookup table number table stores information indicating one of the conversion tables that best approximates image correction data at a given position on the screen for each of said corresponding positions on the screen; and wherein the conversion table for the given position is determined by comparing the image correction data calculated at the given position with respective conversion tables stored in the lookup tables.

* * * * *